US012565259B2

(12) United States Patent
Tsuchimoto et al.

(10) Patent No.: US 12,565,259 B2
(45) Date of Patent: Mar. 3, 2026

(54) ROTARY MACHINE CONTROL DEVICE AND ELECTRIC POWER STEERING DEVICE

(71) Applicant: Mitsubishi Electric Corporation, Tokyo (JP)

(72) Inventors: Yuya Tsuchimoto, Tokyo (JP); Tatsuya Mori, Tokyo (JP); Chiaki Fujimoto, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 487 days.

(21) Appl. No.: 18/269,381

(22) PCT Filed: Apr. 16, 2021

(86) PCT No.: PCT/JP2021/015678
§ 371 (c)(1),
(2) Date: Jun. 23, 2023

(87) PCT Pub. No.: WO2022/219795
PCT Pub. Date: Oct. 20, 2022

(65) Prior Publication Data
US 2024/0051598 A1 Feb. 15, 2024

(51) Int. Cl.
*B62D 5/04* (2006.01)
*H02P 6/28* (2016.01)
(Continued)

(52) U.S. Cl.
CPC .......... *B62D 5/0463* (2013.01); *B62D 5/0403* (2013.01); *H02P 6/28* (2016.02); *H02P 21/22* (2016.02); *H02P 27/085* (2013.01)

(58) Field of Classification Search
CPC .... B62D 5/0463; B62D 5/0403; B62D 5/046; B62D 5/0481; H02P 27/085; H02P 21/22; H02P 25/22; H02P 6/28
(Continued)

(56) References Cited

U.S. PATENT DOCUMENTS 12,145,664 B2 * 11/2024 Jeong ..................... B62D 5/046
12,184,209 B2 * 12/2024 Suzuki ................... B62D 5/046
(Continued)

FOREIGN PATENT DOCUMENTS

JP       2011-195089 A    10/2011
JP       2020-011670 A     1/2020
WO       2018/088465 A1    5/2018

*Primary Examiner* — Valentin Neacsu
*Assistant Examiner* — Marlon A Arce
(74) *Attorney, Agent, or Firm* — Sughrue Mion, PLLC

(57) ABSTRACT

A rotary machine control device includes: a first inverter that applies an alternating-current voltage to three-phase windings of a first system included in a rotary machine, according to a first direct-current voltage; a second inverter that applies an alternating-current voltage to three-phase windings of a second system included in the rotary machine; a first controller that generates a command value of a d-axis electric current of the first system, according to a direct-current voltage minimum value and a command value of the rotary machine, the direct-current voltage minimum value being a lower one of the first direct-current voltage and the second direct-current voltage, that generates a command value of a q-axis electric current of the first system, according to the direct-current voltage minimum value and the command value of the d-axis electric current of the first system, and that controls the first inverter, according to the command value of the d-axis electric current of the first system and the command value of the q-axis electric current of the first system; and a second controller that generates a command value of a d-axis electric current of the second system,
(Continued)

according to the direct-current voltage minimum value and the command value of the rotary machine, that generates a command value of a q-axis electric current of the second system, according to the direct-current voltage minimum value and the command value of the d-axis electric current of the second system, and that controls the second inverter, according to the command value of the d-axis electric current of the second system and the command value of the q-axis electric current of the second system.

10 Claims, 8 Drawing Sheets

(51) Int. Cl.
    *H02P 21/22*           (2016.01)
    *H02P 27/08*           (2006.01)

(58) Field of Classification Search
    USPC ................................................. 180/443, 446
    See application file for complete search history.

(56)               References Cited

U.S. PATENT DOCUMENTS

| | | | |
|---|---|---|---|
| 12,304,577 B2 * | 5/2025 | Tamaru ................... | H02P 25/22 |
| 12,434,724 B2 * | 10/2025 | Kajisawa .............. | B60R 16/033 |
| 2019/0260324 A1 * | 8/2019 | Kuramitsu ........... | B62D 5/0484 |
| 2020/0023888 A1 * | 1/2020 | Horitake .................. | H02J 7/34 |
| 2020/0251966 A1 * | 8/2020 | Endo ........................ | H02P 27/06 |
| 2020/0313590 A1 * | 10/2020 | Otake ................. | B62D 5/0463 |
| 2021/0046973 A1 * | 2/2021 | Koseki ................. | H02P 29/028 |

* cited by examiner 72-1 (72)

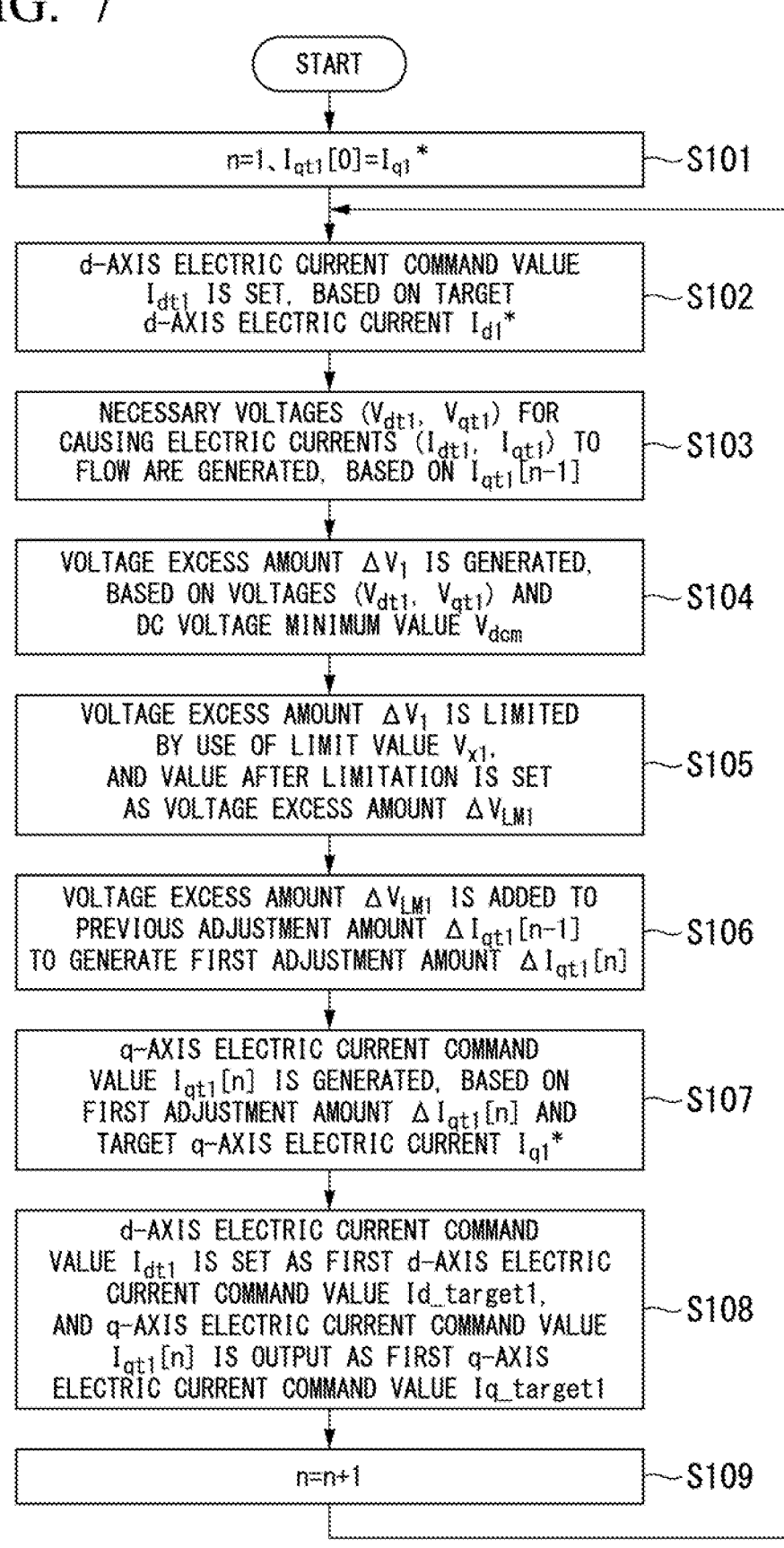

START $n=1$, $I_{qt1}[0]=I_{q1}{}^*$     ~S101 d-AXIS ELECTRIC CURRENT COMMAND VALUE $I_{dt1}$ IS SET, BASED ON TARGET d-AXIS ELECTRIC CURRENT $I_{d1}{}^*$     ~S102

NECESSARY VOLTAGES $(V_{dt1}, V_{qt1})$ FOR CAUSING ELECTRIC CURRENTS $(I_{dt1}, I_{qt1})$ TO FLOW ARE GENERATED, BASED ON $I_{qt1}[n-1]$     ~S103

VOLTAGE EXCESS AMOUNT $\Delta V_1$ IS GENERATED, BASED ON VOLTAGES $(V_{dt1}, V_{qt1})$ AND DC VOLTAGE MINIMUM VALUE $V_{dcm}$     ~S104

VOLTAGE EXCESS AMOUNT $\Delta V_1$ IS LIMITED BY USE OF LIMIT VALUE $V_{x1}$, AND VALUE AFTER LIMITATION IS SET AS VOLTAGE EXCESS AMOUNT $\Delta V_{LM1}$     ~S105

VOLTAGE EXCESS AMOUNT $\Delta V_{LM1}$ IS ADDED TO PREVIOUS ADJUSTMENT AMOUNT $\Delta I_{qt1}[n-1]$ TO GENERATE FIRST ADJUSTMENT AMOUNT $\Delta I_{qt1}[n]$     ~S106 q-AXIS ELECTRIC CURRENT COMMAND VALUE $I_{qt1}[n]$ IS GENERATED, BASED ON FIRST ADJUSTMENT AMOUNT $\Delta I_{qt1}[n]$ AND TARGET q-AXIS ELECTRIC CURRENT $I_{q1}{}^*$     ~S107 d-AXIS ELECTRIC CURRENT COMMAND VALUE $I_{dt1}$ IS SET AS FIRST d-AXIS ELECTRIC CURRENT COMMAND VALUE Id_target1, AND q-AXIS ELECTRIC CURRENT COMMAND VALUE $I_{qt1}[n]$ IS OUTPUT AS FIRST q-AXIS ELECTRIC CURRENT COMMAND VALUE Iq_target1     ~S108

$n=n+1$     ~S109

ROTARY MACHINE CONTROL DEVICE AND ELECTRIC POWER STEERING DEVICE

CROSS REFERENCE TO RELATED APPLICATIONS

This application is a National Stage of International Application No. PCT/JP2021/015678 filed Apr. 16, 2021.

TECHNICAL FIELD

The present disclosure relates to a rotary machine control device and an electric power steering device.

BACKGROUND ART

In an electric power steering device that assists steering with driving force of a rotary machine, a rotary machine control device that controls an assist amount for the steering in two independent systems has been conventionally known (see, for example, Patent Document 1). In such a rotary machine control device, in Patent Document 1, in a case where an arithmetic operation of the assist amount is performed independently in each system and electric current control is conducted independently, mismatch between systems may occur. For this reason, for example, in the technique described in Patent Document 2, a master controller and a slave controller are provided. By transmitting a command value obtained by an arithmetic operation by the master controller to the slave controller, the mismatch between the systems is reduced.

CITATION LIST

Patent Document

Patent Document 1

Japanese Unexamined Patent Application, First Publication No. 2011-195089

Patent Document 2

PCT International Publication No. WO 2018/088465

SUMMARY OF INVENTION

Technical Problem

In the rotary machine, by the way, an electric current caused to flow to the rotary machine is determined in accordance with a difference between an induced voltage generated in proportion to the rotational speed and an applied voltage of a power converter (for example, an inverter) that drives the rotary machine. Therefore, when the rotary machine rotates at high speed, the induced voltage increases, and the voltage necessary for causing the electric current to flow in accordance with the command value to the rotary machine may become larger than an upper limit value of the applied voltage of the inverter. That is, the electric current caused to flow to the rotary machine is caused to flow, according to a difference between the upper limit value of the applied voltage and the induced voltage, and thus an electric current different from the command value may be caused to flow to the rotary machine. In this case, if the inverters of the respective systems receive the supply of a direct-current voltage from an identical DC power supply, no mismatch between the systems occurs. However, in a case where the inverters of the respective systems receive the supply of the DC voltages from different DC power supplies, a difference between the DC voltages from a plurality of DC power supplies appears to be the difference between the applied voltages applied from the plurality of inverters to the rotary machine. Hence, the mismatch between the systems may occur.

As described above, in the conventional rotary machine control device, for example, in the case where the difference occurs between the DC voltages output from the DC power supplies of the plurality of systems that control the rotary machine, there still remains a possibility that the mismatch between the systems occurs.

The present disclosure has been made to address the above issue, and has an object to provide a rotary machine control device and an electric power steering device, which are capable of reducing mismatch between systems, even in a case where a difference occurs between DC voltages to be output from DC power supplies of a plurality of systems that control the rotary machine.

Solution to Problem

In order to solve the above problem, one aspect of the present disclosure is a rotary machine control device including: a first inverter that applies an alternating-current voltage to three-phase windings of a first system included in a rotary machine, according to a first direct-current voltage that has been output from a first direct-current power supply; a second inverter that applies an alternating-current voltage to three-phase windings of a second system included in the rotary machine, according to a second direct-current voltage that has been output from a second direct-current power supply; a first controller that generates a command value of a d-axis electric current of the first system, according to a direct-current voltage minimum value and a command value of the rotary machine, the direct-current voltage minimum value being a lower one of the first direct-current voltage and the second direct-current voltage, that also generates a command value of a q-axis electric current of the first system, according to the direct-current voltage minimum value and the command value of the d-axis electric current of the first system, and that outputs a first control signal for causing the first inverter to apply the alternating-current voltage to the three-phase windings of the first system, according to the command value of the d-axis electric current of the first system and the command value of the q-axis electric current of the first system that have been generated; and a second controller that generates a command value of a d-axis electric current of the second system, according to the direct-current voltage minimum value and the command value of the rotary machine, that also generates a command value of a q-axis electric current of the second system, according to the direct-current voltage minimum value and the command value of the d-axis electric current of the second system, and that outputs a second control signal for causing the second inverter to apply the alternating-current voltage to the three-phase windings of the second system, according to the command value of the d-axis electric current of the second system and the command value of the q-axis electric current of the second system that have been generated.

In addition, one aspect of the present disclosure is an electric power steering device including: the above-described rotary machine control device; the rotary machine that assists steering; and a torque sensor that detects steering torque in the steering, in that the rotary machine control device controls the rotary machine with an assist command of the steering in accordance with the steering torque that has been detected by the torque sensor, as a command value of the rotary machine.

Advantageous Effects of Invention

According to the present disclosure, even in a case where a difference occurs between DC voltages to be output from DC power supplies of a plurality of systems that control a rotary machine, the mismatch between the systems can be reduced.

BRIEF DESCRIPTION OF DRAWINGS

FIG. 7 is a flowchart illustrating an example of processing of an electric current command arithmetic unit in the first embodiment.

DESCRIPTION OF EMBODIMENTS

Hereinafter, a rotary machine control device and an electric power steering device according to embodiments of the present disclosure will be described with reference to the drawings.

[First Embodiment]

Figure 1:
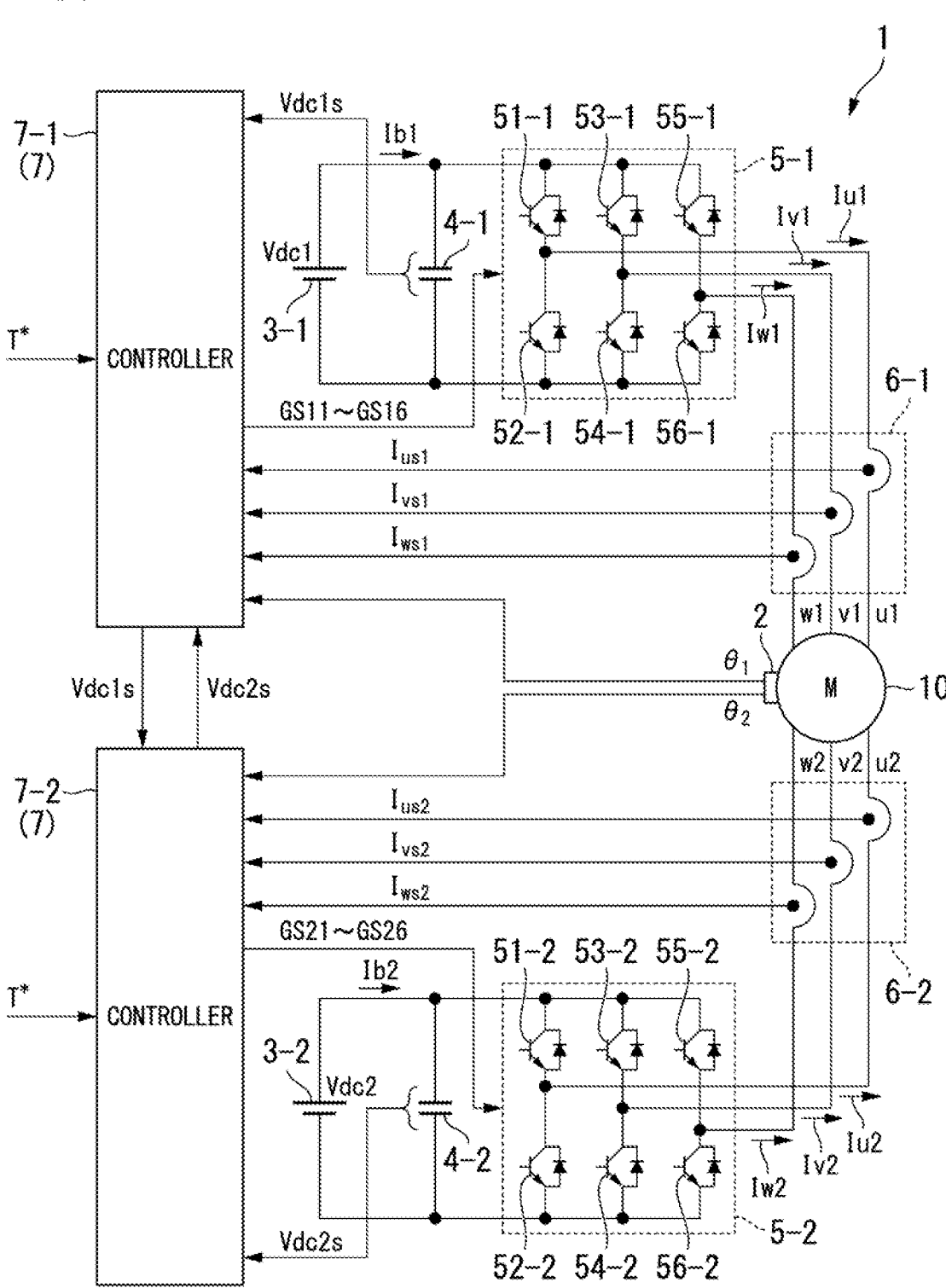
FIG. 1 is a block diagram illustrating an example of a rotary machine control device according to a first embodiment.

FIG. 1 is a block diagram illustrating an example of a rotary machine control device 1 according to a first embodiment.

The rotary machine control device 1 according to the first embodiment is a control device that controls a rotary machine 10. As illustrated in FIG. 1, the rotary machine control device 1 includes a position detector 2, a DC power supply 3-1, a DC power supply 3-2, a capacitor 4-1, a capacitor 4-2, an inverter 5-1, an inverter 5-2, an electric current detector 6-1, an electric current detector 6-2, a controller 7-1, and a controller 7-2.

The rotary machine control device 1 controls the rotary machine 10 using two systems of a first system and a second system. The first system includes the DC power supply 3-1, the capacitor 4-1, the inverter 5-1, the electric current detector 6-1, and the controller 7-1. The second system includes the DC power supply 3-2, the capacitor 4-2, the inverter 5-2, the electric current detector 6-2, and the controller 7-2.

Note that in the present embodiment, "-1" is applied to a reference number of a constitution included in the first system, and "-2" is applied to a reference number of a constitution included in the second system. Regarding each constitution of the first system and each constitution of the second system, in a case where any constitution included in the rotary machine control device 1 is indicated or in a case where the systems are not particularly distinguished from each other, "-1" or "-2" indicating the system from the reference number will be deleted in expression.

The rotary machine 10 is a rotary machine including three-phase windings (u1, v1, w1) of the first system and three-phase windings (u2, v2, w2) of the second system. The rotary machine 10 is, for example, a permanent magnet synchronous motor, an induction motor, a synchronous reluctance motor, or the like. Any motor including two sets of three-phase windings is applicable to the present disclosure. In the following description of the present embodiment, an example in which the rotary machine 10 is a non-salient pole type of permanent magnet synchronous motor will be described.

The position detector 2 detects a rotational position $\theta$ of the rotary machine 10, as a rotational position $\theta_1$ (=$\theta$) of the first system and a rotational position $\theta_2$ (=$\theta$) of the second system. The position detector 2 outputs the rotational position $\theta_1$ of the first system to the controller 7-1 to be described later. In addition, the position detector 2 outputs the rotational position $\theta_2$ of the second system to the controller 7-2 to be described later.

Note that the position detector 2 here is described in a case of a redundant type of outputting two rotational position signals. However, without being limited to the redundant type, furthermore, the rotational position $\theta_1$ of the first system and the rotational position $\theta_2$ of the second system may be obtained using a rotational position sensorless control method.

The DC power supply 3-1 is a DC power supply having two outputs on a high potential side and a low potential side in the first system, and is an example of a first DC power supply. The DC power supply 3-1 outputs a first DC voltage Vdc1 to the inverter 5-1 to be described later, as the end voltage of both of the two outputs on the high potential side and the low potential side. Examples of the DC power supply 3-1 include all devices that output a DC voltage, such as a battery, a DC-DC converter, a diode rectifier, and a PWM rectifier.

The DC power supply 3-2 is a DC power supply including two outputs on a high potential side and a low potential side in the second system, and is an example of a second DC power supply. The DC power supply 3-2 outputs a second DC voltage Vdc2 to the inverter 5-2 to be described later, as the end voltage of both of the two outputs on the high potential side and the low potential side. Examples of the DC power supply 3-2 include all devices that output a DC voltage, such as a battery, a DC-DC converter, a diode rectifier, and a PWM rectifier.

The capacitor 4-1 is a capacitor having a predetermined capacitance. The capacitor 4-1 is connected between two output signal lines of the DC power supply 3-1, and is electrically connected in parallel with the DC power supply 3-1. The capacitor 4-1 functions as a smoothing capacitor, which suppresses fluctuation of the first DC voltage Vdc1 to be supplied to the inverter 5-1 to be described later, and which achieves a stable DC voltage. Note that the DC voltage Vdc1 in the capacitor 4-1 is detected by, for example, a voltage detector, not illustrated, and is output to the controller 7-1 to be described later, as a detected DC voltage Vdc1s.

The capacitor 4-2 is a capacitor having a predetermined capacitance. The capacitor 4-2 is connected between two output signal lines of the DC power supply 3-2, and is electrically connected in parallel with the DC power supply 3-2. The capacitor 4-2 functions as a smoothing capacitor, which suppresses fluctuation of a second DC voltage Vdc2 supplied to the inverter 5-2 to be described later, and which enables a stable DC voltage. Note that the DC voltage Vdc2 in the capacitor 4-2 is detected by, for example, a voltage detector, not illustrated, and is output to the controller 7-2 to be described later, as a detected DC voltage Vdc2s.

The inverter 5-1 (an example of a first inverter) applies an alternating current voltage to the three-phase windings (u1, v1, w1) in the first system of the rotary machine 10, according to the first DC voltage Vdc1 that has been output from the DC power supply 3-1. Three switching elements (51-1, 53-1, 55-1) on the high potential side of the DC power supply 3-1 and three switching elements (52-1, 54-1, 56-1) on the low potential side of the DC power supply 3-1 are turned on and off, according to control signals GS11 to GS16 (an example of a first control signal) output from the controller 7-1 to be described later, and the inverter 5-1 performs power conversion of the first DC voltage Vdc1 output from the DC power supply 3-1, and applies an AC voltage to the three-phase windings (u1, v1, w1) in the first system. Accordingly, the inverter 5-1 causes an electric current Iu1, an electric current Iv1, and an electric current Iw1 to flow to the three-phase windings (u1, v1, w1) of the first system.

Here, the control signal GS11, the control signal GS13, and the control signal GS15 are control signals for respectively turning on and off (bringing into a conduction state or a non-conduction state) the switching element 51-1, the switching element 53-1, and the switching element 55-1 on the high potential side in the inverter 5-1. In addition, the control signal GS12, the control signal GS14, and the control signal GS16 are control signals for respectively turning on and off (bringing into a conduction state or a non-conduction state) the switching element 52-1, the switching element 54-1, and the switching element 56-1 on the low potential side in the inverter 5-1.

It is assumed that, for example, in a case of a logic state of "1" (or High), the control signals GS11 to GS16 set the switching elements in ON state, and in a case of the logic state of "0" (or Low), the control signals GS11 to GS16 set the switching elements in OFF state.

The switching element 51-1, the switching element 52-1, the switching element 53-1, the switching element 54-1, the switching element 55-1, and the switching element 56-1 are each, for example, a semiconductor switch such as an insulated gate bipolar transistor (IGBT), a bipolar transistor, or a metal oxide semiconductor (MOS) power transistor. In addition, a diode (or a body diode) is connected in anti-parallel with each the switching element 51-1, the switching element 52-1, the switching element 53-1, the switching element 54-1, the switching element 55-1, and the switching element 56-1.

The inverter 5-2 (an example of a second inverter) applies an AC voltage to the three-phase windings (u2, v2, w2) in the second system of the rotary machine 10, according to the second DC voltage Vdc2 that has been output from the DC power supply 3-2. Three switching elements (51-2, 53-2, 55-2) on the high potential side of the DC power supply 3-2 and three switching elements (52-2, 54-2, 56-2) on the low potential side of the DC power supply 3-2 are turned on and off, according to control signals GS21 to GS26 (an example of a second control signal) output from the controller 7-2 to be described later, and the inverter 5-2 performs power conversion of the second DC voltage Vdc2 output from the DC power supply 3-2, and applies an AC voltage to the three-phase windings (u2, v2, w2) in the second system. Accordingly, the inverter 5-2 causes an electric current Iu2, an electric current Iv2, and an electric current Iw2 to flow to the three-phase windings (u2, v2, w2) of the second system.

Here, the control signal GS21, the control signal GS23, and the control signal GS25 are control signals for respectively turning on and off (bringing into a conduction state or a non-conduction state) the switching element 51-2, the switching element 53-2, and the switching element 55-2 on the high potential side in the inverter 5-2. In addition, the control signal GS22, the control signal GS24, and the control signal GS26 are control signals for respectively turning on and off (bringing into a conduction state or a non-conduction state) the switching element 52-2, the switching element 54-2, and the switching element 56-2 on the low potential side in the inverter 5-2.

It is assumed that, for example, in a case of a logic state of "1" (or High), the control signals GS21 to GS26 set the switching elements in ON state, and in a case of the logic state of "0" (or Low), the control signals GS21 to GS26 set the switching elements in OFF state.

The switching element 51-2, the switching element 52-2, the switching element 53-2, the switching element 54-2, the switching element 55-2, and the switching element 56-2 are each, for example, a semiconductor switch such as an IGBT, a bipolar transistor, or a MOS power transistor. In addition, a diode (or a body diode) is connected in anti-parallel with each the switching element 51-2, the switching element 52-2, the switching element 53-2, the switching element 54-2, the switching element 55-2, and the switching element 56-2.

The electric current detector 6-1 (an example of a first electric current detector) detects the electric current Iu1, the electric current Iv1, and the electric current Iw1, which respectively flow through the three-phase windings (u1, v1, w1) in the first system of the rotary machine 10, as an electric current value $I_{us1}$, an electric current value $I_{vs1}$, and an electric current value $I_{ws1}$. The electric current detector 6-1 may be of a type in which an electric current detection resistance (shunt resistance) is provided in series with the switching element 52-1, the switching element 54-1, and the switching element 56-1 of the inverter 5-1 to perform detection (so-called lower arm three-shunt type). In addition, the electric current detector 6-1 may use a type (bus-line single-shunt type) in which an electric current detection resistance is provided between the inverter 5-1 and the capacitor 4-1 to detect a direct current, and the electric current Iu1, the electric current Iv1, and the electric current Iw1, which respectively flow through the three-phase windings (u1, v1, w1) in the first system of the rotary machine 10 are reproduced.

The electric current detector 6-2 (an example of a second electric current detector) detects the electric current Iu2, the electric current Iv2, and the electric current Iw2, which respectively flow through the three-phase windings (u2, v2, w2) in the second system of the rotary machine 10, as an electric current value $I_{us2}$, an electric current value $I_{vs2}$, and an electric current value $I_{ws2}$. The electric current detector 6-2 may be of a type in which an electric current detection resistance (shunt resistance) is provided in series with the switching element 52-2, the switching element 54-2, and the switching element 56-2 of the inverter 5-2 to perform detection (so-called lower arm three-shunt type). In addition, the electric current detector 6-2 may use a type (bus-line single-shunt type) in which an electric current detection resistance is provided between the inverter 5-2 and the capacitor 4-2 to detect a direct current, and the electric current Iu2, the electric current Iv2, and the electric current Iw2, which respectively flow through the three-phase windings (u2, v2, w2) in the second system of the rotary machine 10 are reproduced.

The controller 7-1 (an example of a first controller) includes, for example, a central processing unit (CPU), and controls the rotary machine 10 by the first system. The controller 7-1 generates a first d-axis electric current command value Id_target1, according to a DC voltage minimum value $V_{dcm}$, which is the lower one of the first DC voltage Vdc1 and the second DC voltage Vdc2, and a command value (T*) of the rotary machine 10. Note that in the following description, a variable applied with a superscript "*" indicates a target value.

In addition, the controller 7-1 generates the first q-axis electric current command value Iq_target1, according to the DC voltage value minimum value $V_{dcm}$ and the first d-axis electric current command value Id_target1.

Note that in the present embodiment, the detected DC voltage Vdc1s is used as the first DC voltage Vdc1, and in addition, the detected DC voltage Vdc2s is used as the second DC voltage Vdc2. That is, the DC voltage minimum value $V_{dcm}$ is the smaller one of the detected DC voltage Vdc1s of the first DC voltage Vdc1 and the detected DC voltage Vdc2s of the second DC voltage Vdc2. In addition, the first d-axis electric current command value Id_target1 is an electric current command value obtained by converting an electric current command value into a d-axis rotational coordinate, and indicates a command value of the d-axis electric current of the first system. Further, the first q-axis electric current command value Iq_target1 is an electric current command value obtained by converting the electric current command value into a q-axis rotational coordinate, and indicates a command value of the q-axis electric current of the first system.

The controller 7-1 outputs control signals GS11 to GS16 for causing the inverter 5-1 to apply an AC voltage to the three-phase windings (u1, v1, w1) of the first system, according to the first d-axis electric current command value Id_target1 and the first q-axis electric current command value Iq_target1 that have been generated. The controller 7-1 outputs the control signals GS11 to GS16, according to the first d-axis electric current command value Id_target1 and the first q-axis electric current command value Iq_target1 that have been internally generated, the rotational position $\theta_1$ that has been detected by the position detector 2, the electric current detected values (the electric current value $I_{us1}$, the electric current value $I_{vs1}$, and the electric current value $I_{ws1}$) that have been detected by the electric current detector 6-1, the first DC voltage Vdc1s (=Vdc1) that has been detected from the DC power supply 3-1, and the second DC voltage Vdc2s (=Vdc2) that has been detected from the DC power supply 3-2.

Note that details of the constitution of the controller 7-1 will be described later with reference to FIG. 2.

The controller 7-2 (an example of a second controller) includes, for example, a CPU, and controls the rotary machine 10 by the second system. The controller 7-2 generates a second d-axis electric current command value Id target2, according to the DC voltage minimum value $V_{dcm}$, which is the lower one of the first DC voltage Vdc1 and the second DC voltage Vdc2, and the command value (T*) of the rotary machine 10. In addition, the controller 7-2 generates the second q-axis electric current command value Iq_target2, according to the DC voltage minimum value $V_{dcm}$ and the second d-axis electric current command value Id_target2.

Note that in the present embodiment, the detected DC voltage Vdc1s is used as the first DC voltage Vdc1, and in addition, the detected DC voltage Vdc2s is used as the second DC voltage Vdc2. In addition, the second d-axis electric current command value Id_target2 is an electric current command value obtained by converting the electric current command value into a d-axis rotational coordinate, and indicates a command value of the d-axis electric current of the second system. Further, the second q-axis electric current command value Iq_target2 is an electric current command value obtained by converting the electric current command value into a q-axis rotational coordinate, and indicates a command value of the q-axis electric current of the second system.

The controller 7-2 outputs control signals GS21 to GS26 for causing the inverter 5-2 to apply an AC voltage to the three-phase windings (u2, v2, w2) of the second system, according to the second d-axis electric current command value Id_target2 and the second q-axis electric current command value Iq_target2 that have been generated. The controller 7-2 outputs control signals GS21 to GS26, according to the second d-axis electric current command value Id_target2 and the second q-axis electric current command value Iq_target2 that have been internally generated, the rotational position $\theta_2$ that has been detected by the position detector 2, the electric current detected values (the electric current value $I_{us2}$, the electric current value 1,2, and the electric current value $I_{ws2}$) that have been detected by the electric current detector 6-2, the second DC voltage Vdc2s (=Vdc2) that has been detected from the DC power supply 3-2, and the first DC voltage Vdc1s (=Vdc1) that has been detected from the DC power supply 3-1.

Note that details of the constitution of the controller 7-2 will be described later with reference to FIG. 2.

Next, details of the constitutions of the controller 7-1 and the controller 7-2 will be described with reference to FIG. 2.

Figure 2:
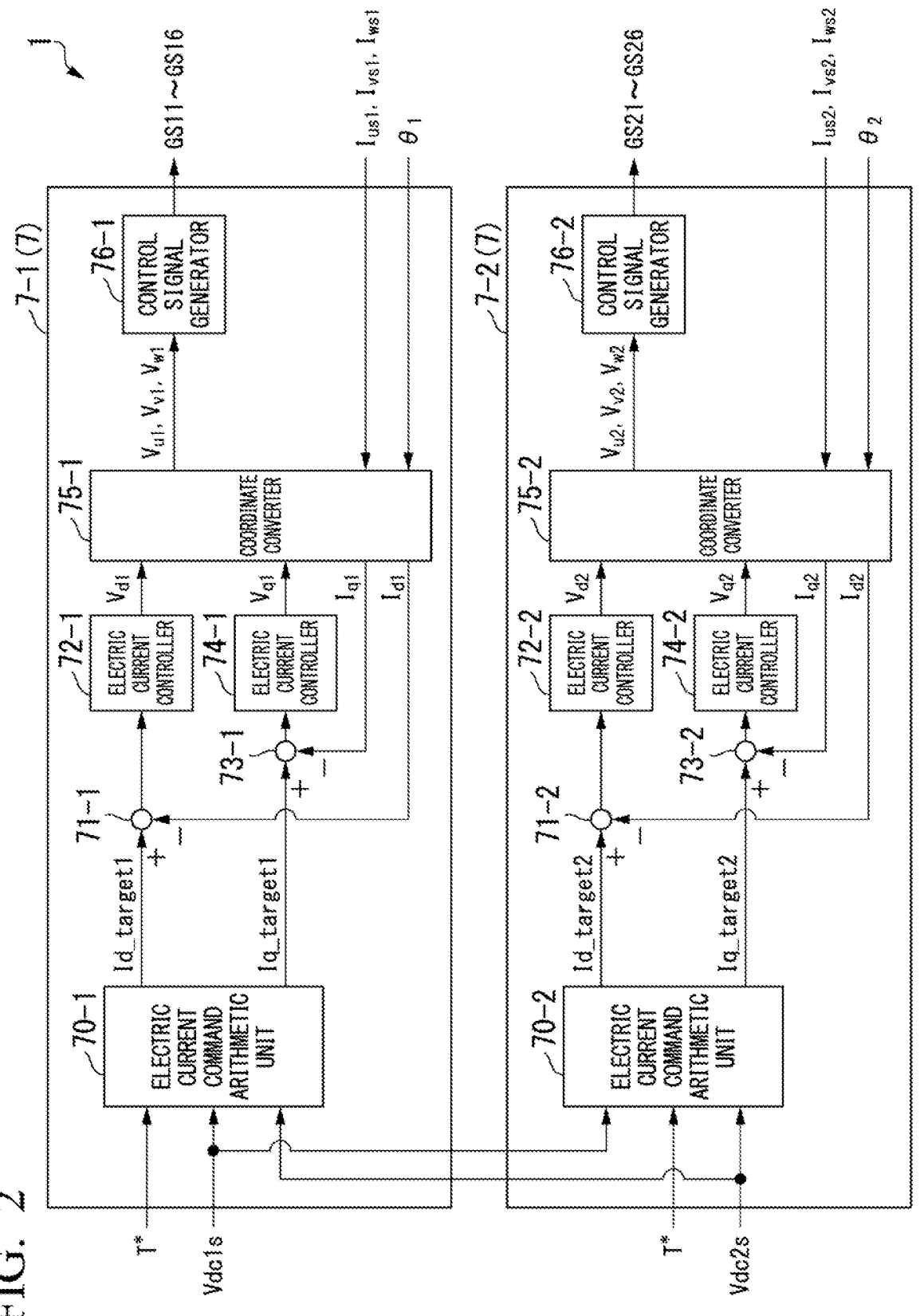
FIG. 2 is a block diagram illustrating an example of controllers in two systems of the rotary machine control device according to the first embodiment.

FIG. 2 is a block diagram illustrating an example of the controllers 7 in two systems of the rotary machine control device 1 according to the present embodiment.

As illustrated in FIG. 2, the controller 7-1 includes an electric current command arithmetic unit 70-1, a subtractor 71-1, an electric current controller 72-1, a subtractor 73-1, an electric current controller 74-1, a coordinate converter 75-1, and a control signal generator 76-1.

The electric current command arithmetic unit 70-1 generates the first d-axis electric current command value Id_target1 and the first q-axis electric current command value Iq_target1, according to the command value (T*) of the rotary machine, the first DC voltage Vdc1s, and the second DC voltage Vdc2s. Details of the processing of the electric current command arithmetic unit 70-1 will be described later.

The subtractor 71-1 subtracts the electric current $I_{d1}$ on two axes of rotation from the first d-axis electric current command value Id_target1, and outputs its result to the electric current controller 72-1. The electric current $L_{d1}$ is output from the coordinate converter 75-1.

The subtractor 73-1 subtracts the electric current $I_{q1}$ on two axes of rotation from the first q-axis electric current command value Iq_target1, and outputs its result to the electric current controller 74-1. The electric current $I_{q1}$ is output from the coordinate converter 75-1.

The electric current controller 72-1 conducts proportional and integral control on an output value of the subtractor 71-1, so that the output value of the subtractor 71-1 becomes "0" (zero), and outputs a voltage $V_{d1}$ on two axes of rotation. Here, a detailed constitution of the electric current controller 72-1 will be described with reference to FIG. 3.

Figure 3:
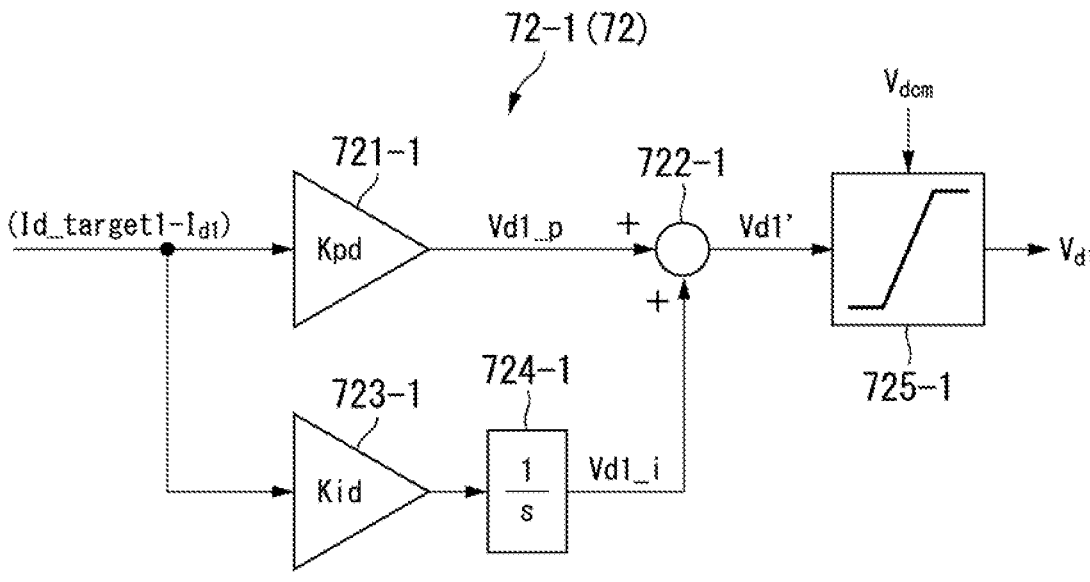
FIG. 3 is a block diagram illustrating an example of an electric current controller that generates a d-axis voltage command value in the first embodiment.

FIG. 3 is a block diagram illustrating an example of the electric current controller 72-1, which generates a d-axis voltage command value in the present embodiment.

As illustrated in FIG. 3, the electric current controller 72-1 includes an amplifier 721-1, an adder 722-1, an amplifier 723-1, an integrator 724-1, and a limiter 725-1.

The amplifier 721-1 multiplies (the first d-axis electric current command value Id_target1–$I_{d1}$) by Kpd, and outputs its result to the adder 722-1, as an output value Vd1_p. Here, an amplification coefficient Kpd is, for example, a value ($\omega cc \times Ld$) obtained by multiplying a desired electric current control response $\omega cc$ ([rad/s (radian/second)]) by a d-axis inductance Ld of the rotary machine 10.

The amplifier 723-1 multiplies (the first d-axis electric current command value Id_target1–$I_{d1}$) by Kid, and outputs its result. Here, an amplification coefficient Kid is, for example, a value ($\omega cc \times R$) obtained by multiplying a desired electric current control response $\omega cc$ by a winding resistance R of the rotary machine 10.

The integrator 724-1 integrates an output (Kid$\times$(Id1_target1–$I_{d1}$)) of the amplifier 723-1, and outputs its result as an output value Vd1_i. That is, the value Vd1_i is (Kid/s$\times$(Id1_target1–$I_{d1}$)). Here, "s" represents a Laplace operator.

The adder 722-1 adds the output value Vd1_p of the amplifier 721-1 and the output value Vd1_i of the integrator 724-1, and outputs its result to the limiter 725-1, as an output value Vd1'.

The limiter 725-1 limits the output value Vd1' of the adder 722-1, according to the DC voltage minimum value $V_{dcm}$. Specifically, the limiter 725-1 limits the output value Vd1' of the adder 722-1 in the following equation (1), and generates the voltage Val on two axes of rotation that is an output value.

[Equation 1]

$$\left. \begin{array}{l} V_{d1} = -V_{dcm}/\sqrt{2}, \ (Vd1' < -V_{dcm}/\sqrt{2}) \\ V_{d1} = Vd1', \ (-V_{dcm}/\sqrt{2} < Vd1' < V_{dcm}/\sqrt{2}) \\ V_{d1} = V_{dcm}/\sqrt{2}, \ (V_{dcm}/\sqrt{2} < Vd1') \end{array} \right\} \quad (1)$$

As expressed in the equation (1), the limiter 725-1 generates the voltage Val on two axes of rotation as follows, in accordance with a relationship between the output value Vd1' of the adder 722-1 and the DC voltage minimum value $V_{dcm}$.

(a) In a case where the output value Vd1' of the adder 722-1 is smaller than ($-v_{dcm}/2^{0.5}$), the limiter 725-1 generates ($-V_{dcm}/2^{0.5}$) as the voltage $V_{d1}$ ($V_{d1}=-V_{dcm}/2^{0.5}$). (b) In a case where the output value Vd1' of the adder 722-1 falls between ($-v_{dcm}/2^{0.5}$) and ($V_{dcm}/2^{0.5}$), the limiter 725-1 generates the output value Vd1' of the adder 722-1, as the voltage $V_{d1}$ ($V_{d1}=Vd1'$).

(c) In a case where the output value Vd1' of the adder 722-1 is larger than ($V_{dcm}/2^{0.5}$), the limiter 725-1 generates ($V_{dcm}/2^{0.5}$) as the voltage $V_{d1}$ ($V_{d1}=V_{dcm}/2^{0.5}$).

In this manner, the limiter 725-1 generates the voltage $V_{d1}$ so that an absolute value of the output value Vd1' of the adder 722-1 is equal to or smaller than ($V_{dcm}/2^{0.5}$). Note that, for example, in a case where it is desired to actively reset the output value Vd1_i, which is an integration term, of the integrator 724-1, the limiter 725-1 may use anti-windup control of a known technique.

Returning to the description of FIG. 2, the electric current controller 74-1 conducts proportional and integral control on an output value of the subtractor 73-1, so that the output value of the subtractor 73-1 becomes "0" (zero), and outputs a voltage $V_{q1}$ on two axes of rotation. Here, a detailed constitution of the electric current controller 74-1 will be described with reference to FIG. 4.

Figure 4:
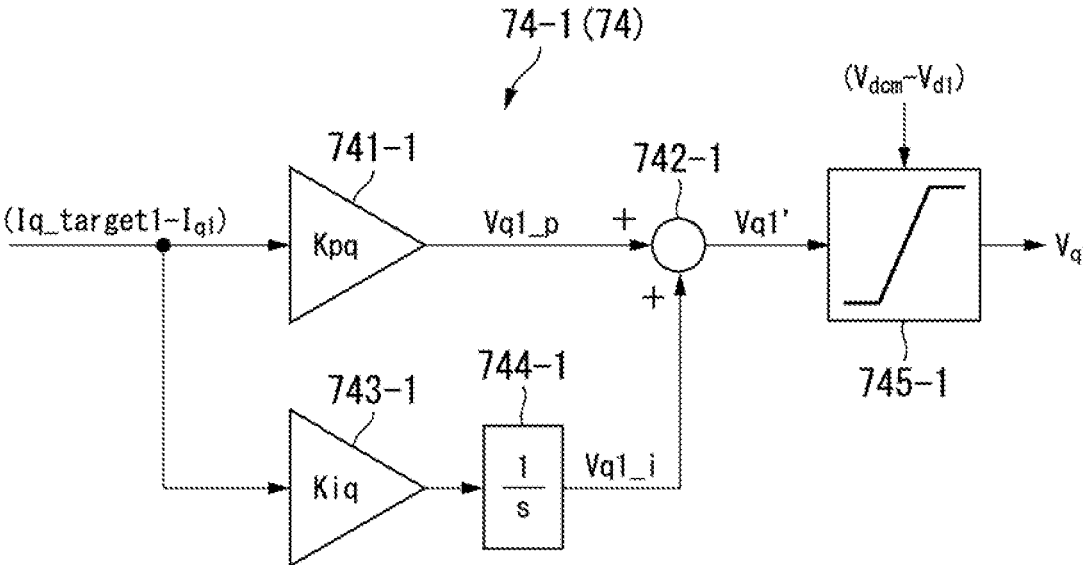
FIG. 4 is a block diagram illustrating an example of an electric current controller that generates a q-axis voltage command value in the first embodiment.

FIG. 4 is a block diagram illustrating an example of the electric current controller 74-1, which generates a q-axis voltage command value in the present embodiment.

As illustrated in FIG. 4, the electric current controller 74-1 includes an amplifier 741-1, an adder 742-1, an amplifier 743-1, an integrator 744-1, and a limiter 745-1.

The amplifier 741-1 multiplies (the first q-axis electric current command value Iq_target1–$I_{q1}$) by Kpq, and outputs its result to adder 742-1, as an output value Vq1_p. Here, an amplification coefficient Kpq is, for example, a value ($\omega cc \times Lq$) obtained by multiplying a desired electric current control response wcc ([rad/s (radian/second)]) by a q-axis inductance Lq of the rotary machine 10.

The amplifier 743-1 multiplies (the first q-axis electric current command value Iq_target1–$I_{q1}$) by Kiq, and outputs its result. Here, an amplification coefficient Kiq is, for example, a value ($\omega cc \times R$) obtained by multiplying the desired electric current control response wcc by the winding resistance R of the rotary machine 10.

The integrator 744-1 integrates the output (Kiq$\times$(Iq_target1–$I_{q1}$)) of the amplifier 743-1, and outputs its result as an output value Vq1_i. That is, the value Vq1_i is (Kiq/s$\times$(Iq_target1–$I_{q1}$)). Here, "s" represents a Laplace operator.

The adder 742-1 adds the output value Vq1_p of the amplifier 741-1 and the output value Vq1_i of the integrator 744-1, and outputs its result to the limiter 745-1, as an output value Vq1'.

The limiter 745-1 limits the output value Vq1' of the adder 742-1, according to the DC voltage minimum value $V_{dcm}$ and the voltage $V_{d1}$. Specifically, the limiter 745-1 limits the voltage Vq1' of the adder 742-1 in the following equation (2), and generates a voltage $V_{q1}$ on two axes of rotation that is an output value.

[Equation 2]

$$\left. \begin{array}{l} V_{q1} = -(V_{dcm} - V_{d1})/\sqrt{2}, \ (Vq1' < -(V_{dcm} - V_{d1})/\sqrt{2}) \\ V_{q1} = Vq1', \ (-(V_{dcm} - V_{d1})/\sqrt{2} < Vq1' < (V_{dcm} - V_{d1})/\sqrt{2}) \\ V_{q1} = (V_{dcm} - V_{d1})/\sqrt{2}, \ ((V_{dcm} - V_{d1})/\sqrt{2} < Vq1') \end{array} \right\} \quad (2)$$

As expressed in the equation (2), the limiter 745-1 generates the voltage $V_{q1}$ as follows in accordance with a relationship between the output value Vq1' of the adder 742-1 and a value obtained by subtracting the voltage $V_{d1}$ from the DC voltage minimum value $V_{dcm}$ ($V_{dcm}-V_{d1}$).

(d) In a case where the output value Vq1' of the adder 742-1 is smaller than ($-(V_{dcm}-V_{d1})/2^{0.5}$), the limiter 745-1 generates ($-(V_{dcm}-V_{d1})/2^{0.5}$) as the voltage $V_{q1}$ ($V_{q1}=-(V_{dcm}-V_{d1})/2^{0.5}$).

(e) In a case where the output value Vq1' of the adder 742-1 falls between $(-(V_{dcm}-V_{d1})/2^{0.5})$ and $((V_{dcm}-V_{d1})/2^{0.5})$, the limiter 745-1 generates the output value Vq1' of the adder 742-1, as the voltage $V_{q1}$ ($V_{q1}$=Vq1').

(f) In a case where the output value Vq1' of the adder 742-1 is larger than $((V_{dcm}-V_{d1})/2^{0.56l})$, the limiter 745-1 generates $((V_{dcm}-V_{d1})/2^{0.5})$ as the voltage $V_{q1}$ ($V_{q1}$=$(V_{dcm}-V_{d1})/2^{0.5}$).

In this manner, the limiter 745-1 generates the voltage $V_{q1}$ so that an absolute value of the output value Vq1' of the adder 742-1 is equal to or smaller than $((V_{dcm}-V_{d1})/2^{0.5})$. Note that, for example, in a case where it is desired to actively reset the output value Vq1_i, which is an integration term, of the integrator 744-1, the limiter 745-1 may use an anti-windup control of a known technique.

Note that the voltage $V_{d1}$ and the voltage $V_{q1}$ that have been described above are voltage command values on two axes of rotation.

Returning to the description of FIG. 2, the coordinate converter 75-1 converts the electric current value $I_{us1}$, the electric current value $I_{vs1}$, and the electric current value $I_{ws1}$ that have been detected by the electric current detector 6-1 into the electric current $I_{d1}$ and the electric current $I_{q1}$ on two axes of rotation, according to the rotational position $\theta_1$. Specifically, the coordinate converter 75-1 generates the electric current $I_{d1}$ and the electric current $I_{q1}$ on two axes of rotation from the electric current value $I_{us1}$, the electric current value $I_{vs1}$, the electric current value $I_{ws1}$, and the rotational position $\theta_1$ in the following equation (3).

[Equation 3]

$$\begin{pmatrix} I_{d1} \\ I_{q1} \end{pmatrix} = \frac{\sqrt{2}}{\sqrt{3}} \begin{bmatrix} \cos(\theta_1) & \cos\left(\theta_1 - \frac{2\pi}{3}\right) & \cos\left(\theta_1 + \frac{2\pi}{3}\right) \\ -\sin(\theta_1) & -\sin\left(\theta_1 + \frac{2\pi}{3}\right) & -\sin\left(\theta_1 + \frac{2\pi}{3}\right) \end{bmatrix} \begin{bmatrix} I_{us1} \\ I_{vs1} \\ I_{ws1} \end{bmatrix} \quad (3)$$

The coordinate converter 75-1 outputs, to the subtractor 71-1, the electric current $I_{d1}$ that has been generated. In addition, the coordinate converter 75-1 outputs, to the subtractor 73-1, the electric current $I_{q1}$ that has been generated.

Further, the coordinate converter 75-1 converts the voltage $V_{d1}$ and the voltage $V_{q1}$, which are voltage commands on two axes of rotation, into a voltage $V_{u1}$, a voltage $V_{v1}$, and a voltage $V_{w1}$, which are voltage commands on three-phase axes, according to the rotational position $\theta_1$. Specifically, the coordinate converter 75-1 generates the voltage $V_{u1}$, the voltage $V_{v1}$, and the voltage $V_{w1}$, which are voltage commands on three-phase axes, from the voltage $V_{d1}$, the voltage $V_{q1}$, and the rotational position $\theta_1$ in the following equation (4).

[Equation 4]

$$\begin{pmatrix} V_{u1} \\ V_{v1} \\ V_{w1} \end{pmatrix} = \frac{\sqrt{2}}{\sqrt{3}} \begin{bmatrix} \cos(\theta_1) & -\sin(\theta_1) \\ \cos\left(\theta_1 - \frac{2\pi}{3}\right) & -\sin\left(\theta_1 + \frac{2\pi}{3}\right) \\ \cos\left(\theta_1 + \frac{2\pi}{3}\right) & -\sin\left(\theta_1 + \frac{2\pi}{3}\right) \end{bmatrix} \begin{bmatrix} V_{d1} \\ V_{q1} \end{bmatrix} \quad (4)$$

The coordinate converter 75-1 outputs, to the control signal generator 76-1, the voltage $V_{u1}$, voltage $V_{v1}$, and voltage $V_{w1}$ that have been generated.

The control signal generator 76-1 outputs the control signals GS11 to GS16 of the inverter 5-1, according to the first DC voltage Vdc1s, and the voltage $V_{u1}$, the voltage $V_{v1}$, and the voltage $V_{w1}$, which are voltage command values on three-phase axes. Here, a detailed constitution of the control signal generator 76-1 will be described with reference to FIG. 5.

Figure 5:
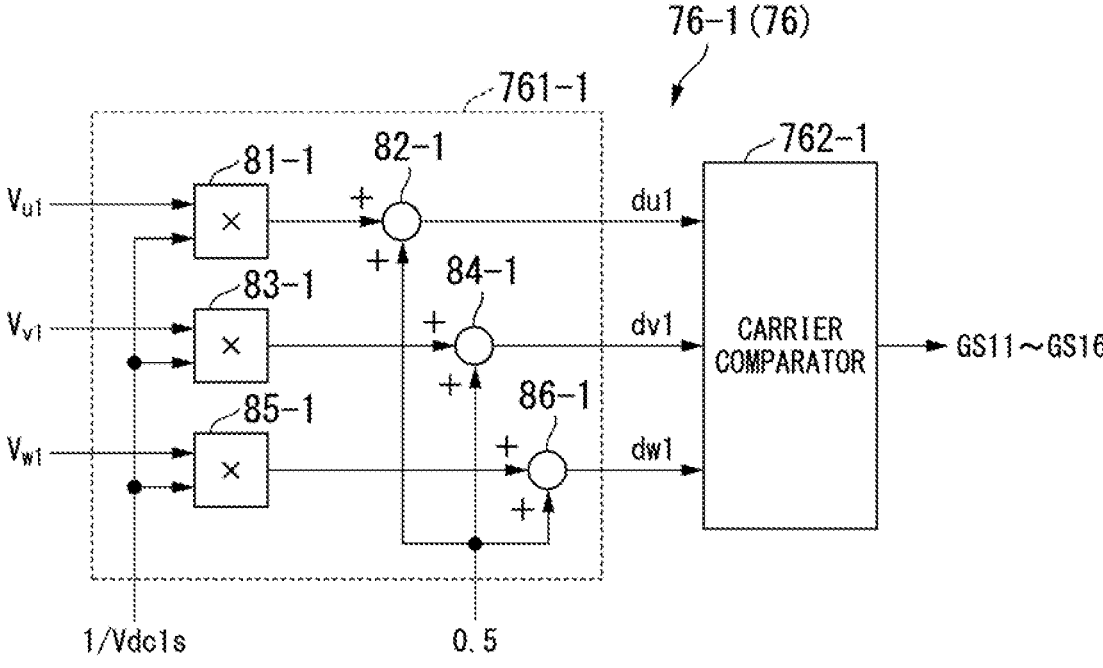
FIG. 5 is a block diagram illustrating an example of a control signal generator in the first embodiment.

FIG. 5 is a block diagram illustrating an example of the control signal generator 76-1 in the present embodiment.

As illustrated in FIG. 5, the control signal generator 76-1 includes a duty arithmetic unit 761-1 and a carrier comparator 762-1.

The duty arithmetic unit 761-1 outputs first duties (du1, dv1, dw1) that are values obtained by respectively normalizing them using the first DC voltage Vdc1s, according to the voltage $V_{u1}$, the voltage $V_{v1}$, and the voltage $V_{w1}$. The duty arithmetic unit 761-1 generates the first duties (du1, dv1, dw1) in, for example, the following equation (5).

[Equation 5]

$$\left. \begin{array}{l} du1 = V_{u1} \times \dfrac{1}{Vdc1s} + 0.5 \\ dv1 = V_{v1} \times \dfrac{1}{Vdc1s} + 0.5 \\ dw1 = V_{w1} \times \dfrac{1}{Vdc1s} + 0.5 \end{array} \right\} \quad (5)$$

The duty arithmetic unit 761-1 includes a multiplier 81-1, an adder 82-1, a multiplier 83-1, an adder 84-1, a multiplier 85-1, and an adder 86-1.

The multiplier 81-1 multiplies the voltage $V_{u1}$ by (1/Vdc1s), and outputs its multiplication result to the adder 82-1.

The adder 82-1 adds "0.5", which is a constant, to the output value of the multiplier 81-1, and outputs its result to the carrier comparator 762-1, as the first duty du1. The multiplier 83-1 multiplies the voltage $V_{v1}$ by (1/Vdc1s), and outputs its multiplication result to the adder 84-1.

The adder 84-1 adds "0.5", which is a constant, to the output value of the multiplier 83-1, and outputs its result to the carrier comparator 762-1, as the first duty dv1.

The multiplier 85-1 multiplies the voltage $V_{w1}$ by (1/Vdc1s), and outputs its multiplication result to the adder 86-1.

The adder 86-1 adds "0.5", which is a constant, to the output value of the multiplier 85-1, and outputs its result to the carrier comparator 762-1, as the first duty dw1.

The carrier comparator 762-1 outputs the control signals GS11 to GS16 of the inverter 5-1, according to the first duties (du1, dv1, dw1). Here, processing of the carrier comparator 762-1 will be described with reference to FIG. 6.

Figure 6:
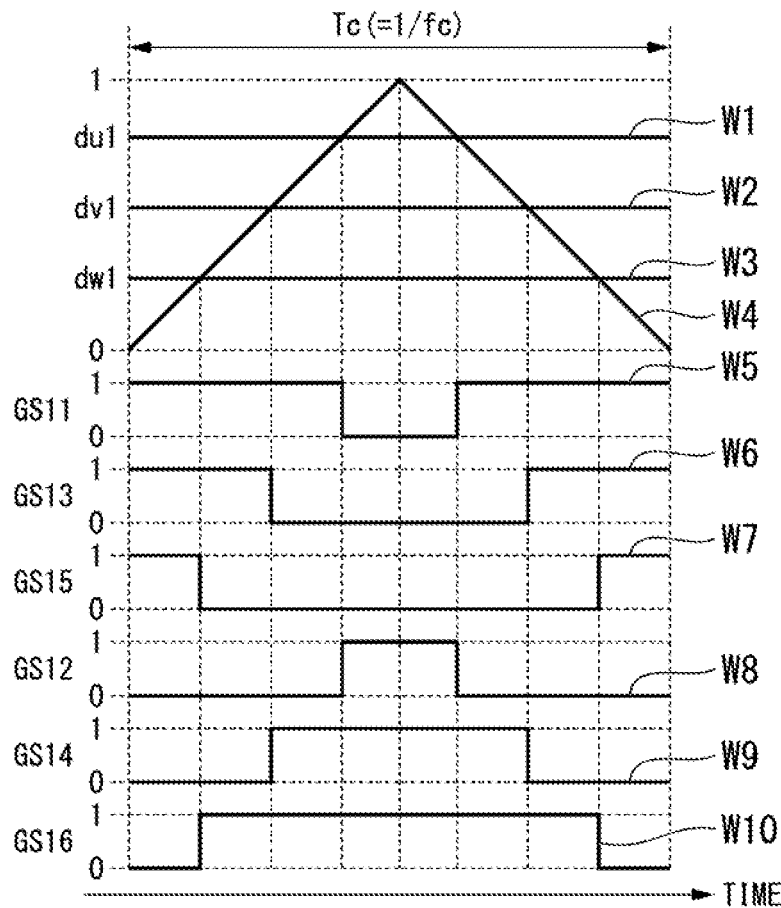
FIG. 6 is a diagram illustrating an example of processing of a carrier comparator in the first embodiment.

FIG. 6 is a diagram illustrating an example of processing of the carrier comparator 762-1 in the present embodiment. In FIG. 6, waveforms W1 to W3 represent waveforms of the first duties (du1, dv1, dw1). In addition, a waveform W4 represents a waveform of a carrier wave CA of a triangular wave in which a peak level is "1" and a valley level is "0". Further, waveforms W5 to W10 sequentially represent waveforms of the control signal GS11, the control signal GS13, the control signal GS15, the control signal GS12, the control signal GS14, and the control signal GS16. Further, the horizontal axis of the graph illustrated in FIG. 6 represents time, and a period Tc (=1/fc, fc represents frequency) represents a period of the carrier wave CA.

As illustrated in FIG. 6, the carrier comparator 762-1 compares the first duties (du1, dv1, dw1) of the waveform W1 to the waveform W3 with the carrier wave CA of the waveform W4, and in a case where the first duty is higher in each phase, sets the control signals (GS11, GS13, GS15) respectively corresponding to the switching elements (51-1, 53-1, 55-1) on the high potential side of the inverter 5-1 in ON state (the value is "1"). In addition, in a case where the first duty is lower in each phase, the carrier comparator 762-1 sets the control signals (GS11, GS13, GS15) respectively corresponding to the switching elements (51-1, 53-1, 55-1) on the high potential side of the inverter 5-1 in OFF state (the value is "0").

In addition, the carrier comparator 762-1 compares the first duties (du1, dv1, dw1) of the waveform W1 to the waveform W3 with the carrier wave CA of the waveform W4, and in a case where the first duty is lower in each phase, sets the control signals (GS12, GS14, GS16) respectively corresponding to the switching elements (52-1, 54-1, 56-1) on the low potential side of the inverter 5-1 in ON state (the value is "1"). In addition, in a case where the first duty is higher in each phase, the carrier comparator 762-1 sets the control signals (GS12, GS14, GS16) respectively corresponding to the switching elements (52-1, 54-1, 56-1) on the high potential side of the inverter 5-1 (the value is "0").

According to such processing of the carrier comparator 762-1, for any one phase (X phase) of the respective phases, in a case where the first duty is assumed to be dx1, dx1 is a ratio at which the control signal on the high potential side sets the switching element in ON state in the period Tc of the carrier wave CA, and (1−dx1) is a ratio at which the control signal on the low potential side sets the switching element in OFF state. Therefore, the potential of the X phase of the inverter 5-1 is the first DC voltage Vdc1 in ON state on the high potential side, and the potential of the X phase of the inverter 5-1 is "0" (GND) in ON state on the low potential side. Accordingly, an output voltage Vx1_PWM of the X phase is expressed in the following equation (6).

$$Vx1\_PWM = dx1 \times Vdc1 \qquad (6)$$

Here, from the equation (5) described above, the duty of the X phase is expressed in the following equation (7).

[Equation 7]

$$dx1 = V_{x1} \times \frac{1}{Vdc1s} + 0.5 \qquad (7)$$

By substituting the equation (7) into the equation (6), the output voltage Vx1_PWM of the X-phase is expressed in the following equation (8).

[Equation 8]

$$Vx1\_PWM = V_{x1} \times \frac{Vdc1}{Vdc1s} + 0.5 \times Vdc1 \qquad (8)$$

Here, in the output voltage Vx1_PWM of the X-phase to be actually output, in a case where the first DC voltage Vdc1s that has been detected is equal to the first DC voltage Vdc1 (real value), only Vx1 remains in the first term on the right side. As a result, the output voltage Vx1_PWM is a voltage in which the first term matches the command value Vx1 with (0.5×Vdc1) of the second term on the right side as the center. Therefore, the inverter 5-1 is capable of outputting the voltage in accordance with the command value.

Returning to the description of FIG. 2 again, the controller 7-2 includes an electric current command arithmetic unit 70-2, a subtractor 71-2, an electric current controller 72-2, a subtractor 73-2, an electric current controller 74-2, a coordinate converter 75-2, and a control signal generator 76-2.

The electric current command arithmetic unit 70-2 generates the second d-axis electric current command value Id_target2 and the second q-axis electric current command value Iq_target2, according to the command value (T*) of the rotary machine, the second DC voltage Vdc2s, and the first DC voltage Vdc1s. The electric current command arithmetic unit 70-2 has a similar constitution to the electric current command arithmetic unit 70-1.

The subtractor 71-2 subtracts the electric current $I_{d2}$ on two axes of rotation from the second d-axis electric current command value Id_target2, and outputs its result to the electric current controller 72-2. The electric current $I_{d2}$ is output from the coordinate converter 75-2.

The subtractor 73-2 subtracts the electric current I q2 on two axes of rotation from the second q-axis electric current command value Iq_target2, and outputs its result to the electric current controller 74-2. The electric current $I_{q2}$ is output from the coordinate converter 75-2.

The electric current controller 72-2 conducts proportional and integral control on an output value of the subtractor 71-2, so that an output value of the subtractor 71-2 becomes "0" (zero), and outputs a voltage Vd2 on two axes of rotation. Since the constitution of the electric current controller 72-2 is similar to that of the electric current controller 72-1 described above, its description is omitted here.

The electric current controller 74-2 conducts proportional and integral control on an output value of the subtractor 73-2, so that the output value of the subtractor 73-2 becomes "0" (zero), and outputs a voltage $V_{q2}$ on two axes of rotation. Since the constitution of the electric current controller 74-2 is similar to that of the electric current controller 74-1 described above, its description is omitted here.

The coordinate converter 75-2 converts the electric current value $I_{us2}$, the electric current value $I_{vs2}$, and the electric current value $I_{ws2}$ that have been detected by the electric current detector 6-2 into an electric current $I_{d2}$ and an electric current $I_{q2}$ on two axes of rotation, according to the rotational position $\theta_2$. In addition, the coordinate converter 75-2 converts the voltage $V_{d2}$ and the voltage $V_{q2}$, which are voltage commands on two axes of rotation, into a voltage $V_{u2}$, a voltage $V_{v2}$, and a voltage $V_{w2}$, which are voltage commands on three-phase axes, according to the rotational position $\theta_2$. Since the constitution of the coordinate converter 75-2 is similar to that of the above-described coordinate converter 75-1, its description is omitted here.

The control signal generator 76-2 outputs the control signals GS21 to GS26 of the inverter 5-2, according to the second DC voltage Vdc2s, and the voltage $V_{u2}$, the voltage $V_{v2}$, and the voltage $V_{w2}$, which are voltage command values on three-phase axes. Since the constitution of the control signal generator 76-2 is similar to that of the above-described control signal generator 76-1, its description is omitted here.

Next, details of processing of the electric current command arithmetic unit 70-1 in the present embodiment will be described.

The electric current command arithmetic unit 70-1 performs an arithmetic operation of the first d-axis electric current command value Id_target1 and the first q-axis electric current command value Iq_target1 for the electric current to flow to the rotary machine 10, as control target values of the rotary machine 10. The electric current command arithmetic unit 70-1 sets the first d-axis electric current command value Id_target1 and the first q-axis electric current command value Iq_target 1, according to a target d-axis electric current $I_{d01}*$ and a target q-axis electric current $I_{q01}*$ that have been subjected to the arithmetic operation, according to the command value (T*) of the rotary machine 10.

In addition, the electric current command arithmetic unit 70-2 performs an arithmetic operation of the second d-axis electric current command value Id_target2 and the second q-axis electric current command value Iq_target2 for the electric current to flow to the rotary machine 10, as control target values of the rotary machine 10. The electric current command arithmetic unit 70-2 sets the second d-axis electric current command value Id_target2 and the second q-axis electric current command value Iq_target2, according to the target d-axis electric current $I_{d02}*$ and the target q-axis electric current $I_{q02}*$ that have been subjected to the arithmetic operation, according to the command value (T*) of the rotary machine 10.

Here, first, the arithmetic operation of the target q-axis electric current $I_{q01}*$ will be described. In the present embodiment, the command value of the rotary machine 10 is set to be a torque command (T*), and the electric current command arithmetic unit 70-1 performs an arithmetic operation of the target q-axis electric current $I_{q01}*$, according to the torque command (T*). Note that a method for performing the arithmetic operation of the target q-axis electric current $I_{q01}*$ is not particularly limited, but, for example, it is calculated by multiplying the torque command (T*) by a proportional constant.

In addition, the electric current command arithmetic unit 70-2 performs an arithmetic operation of $I_{q02}*$ in a similar method to that of $I_{q01}*$. Here, by making the arithmetic methods of the target q-axis electric currents of the first system and the second system identical to each other, the q-axis electric currents of the two systems are made to be identical to each other.

Next, in the present embodiment, the electric current command arithmetic unit 70-1 performs an arithmetic operation of the target d-axis electric current, according to the DC voltage minimum value $V_{dcm}$, which is the lower voltage of the first DC voltage Vdc1 and the second DC voltage Vdc2, and thus makes the d-axis electric currents of the two systems identical to each other. Accordingly, by making the target d-axis electric current and the target q-axis electric current of the two systems identical to each other, as long as the d-axis electric current has a magnitude sufficient to avoid voltage saturation, the electric currents caused to flow in the two systems match each other.

Regarding the arithmetic method of the target d-axis electric current, it is sufficient if the arithmetic operation of the target d-axis electric current is performed, according to the DC voltage minimum value $V_{dcm}$, and the target d-axis electric currents of the two systems are identical to each other, and the method is not limited to a method to be described below. In the present embodiment, the electric current command arithmetic unit 70-1 performs an arithmetic operation of the target d-axis electric current, according to a dq-axes voltage equation using electric constants of the rotary machine 10.

The dq-axes voltage equation of the d-axis voltage $v_{d1}$ and the q-axis voltage $v_{q1}$ is expressed in the following equation (9).

[Equation 9]

$$v_{d1} = (R + p \cdot L) \cdot I_{d01}^* - \omega \cdot L \cdot I_{q01}^* \\ v_{q1} = (R + p \cdot L) \cdot I_{q01}^* - \omega \cdot L \cdot I_{d01}^* + \omega \cdot \varphi \Big\} \tag{9}$$

Note that as the electric constants of the rotary machine 10, a resistance value R, an inductance L, and an induced voltage constant φ are used. In addition, "p" represents a differential operator. The number of rotations ω is calculated by, for example, differentiating the rotational position θ. Note that the number of rotations ω corresponds to the rotational speed of the rotary machine 10.

Here, the term of $(R \times I_{d01})$ is ignored for simplification. Furthermore, in a case where it is assumed that the differential operator p=0, the dq-axes voltage equation of the first system in a steady state is expressed in the following equation (10).

[Equation 10]

$$v_{d1} = -\omega \cdot L \cdot I_{q01}^* \\ v_{q1} = R \cdot I_{q01}^* - \omega \cdot L \cdot I_{d01}^* + \omega \cdot \varphi \Big\} \tag{10}$$

Further, the relationship between the values at which the dq-axes voltage can be output in a range of the DC voltage minimum value $V_{dcm}$ is expressed in the following equation (11). Here, Kv denotes a coefficient with respect to the power supply voltage.

[Equation 11]

$$v_{d1}^2 + v_{q1}^2 = (K_v \cdot V_{dcm})^2, \quad K_v = \frac{0.85}{\sqrt{2}} \tag{11}$$

In addition, in a case where the target d-axis electric current $I_{d01}*$ is calculated from a relationship between the equations (10) and (11), the following equation (12) is obtained. The electric current command arithmetic unit 70-1 calculates the target d-axis electric current $I_{d01}*$, using the equation (12). Note that in order to satisfy $(I_{d01}* \leq 0)$, in a case where an arithmetic operation result of the equation (12) satisfies $(I_{d01}* > 0)$, the electric current command arithmetic unit 70-1 may set $(I_{d01}* = 0)$.

[Equation 12]

$$I_{d01}^* = \frac{-R \cdot I_{q01}^* + V_0}{\omega \cdot L} - \frac{\phi}{L}, \tag{12}$$

$$V_0 = \sqrt{(K_v \cdot V_{dcm})^2 - (\omega \cdot L \cdot I_{q01}^*)^2}$$

Here, the electric current command arithmetic unit 70-1 limits the maximum absolute value of the target d-axis electric current $I_{d01}*$ so that the electric current to flow to the rotary machine 10 does not exceed a rated electric current $I_r$. For example, the electric current command arithmetic unit 70-1 limits the maximum absolute value of the target d-axis electric current $I_{d01}*$ by a value 0.8 times the rated electric current $I_r$.

The electric current command arithmetic unit 70-1 sets the target d-axis electric current $I_{d1}*$ from the $I_{d01}*$, which has been subjected to the arithmetic operation, as the target d-axis electric current $I_{d1} = I_{d01}*$. Note that even though the target d-axis electric current $I_{d01}*$ is "0", the d-axis electric currents of the two systems can be equalized.

In addition, the electric current command arithmetic unit 70-1 sets a target q-axis electric current $I_{q1}*$ by limiting the electric current to flow to the rotary machine 10 so as not to exceed the rated electric current $I_r$. The electric current command arithmetic unit 70-1 sets the target q-axis electric current to* as the target q-axis electric current $I_{q1}*=I_{q01}*$, in a case where the sum of the square of $I_{d01}*$ and the square of $I_{q01}*$ does not exceed the square of the rated electric current $I_r$. Further, in a case where the sum of the square of $I_{q01}*$ and the square of $I_{q01}*$ exceeds the square of the rated electric current $I_r$, the electric current command arithmetic unit 70-1 sets a value obtained by performing the arithmetic operation in the following equation (13), as the target q-axis electric current $I_{q1}*$

[Equation 13]

$$I*_{q1}=\sqrt{I_r^2-I*_{d01}^2} \tag{13}$$

Note that the electric current command arithmetic unit 70-2 has a similar constitution to that of the electric current command arithmetic unit 70-1, and sets a target d-axis electric current $I_{d2}*$ and a target q-axis electric current $I_{q2}*$ from the command value (T*) of the rotary machine 10 in a similar method to that of the electric current command arithmetic unit 70-1 described above.

As described heretofore, the electric current command arithmetic unit 70-1 and the electric current command arithmetic unit 70-2 are capable of causing desired electric currents to flow to the rotary machine 10, as long as the d-axis electric current has a magnitude sufficient to avoid the voltage saturation, and are capable of matching the electric currents caused to flow in the two systems, by making the target currents of the two systems identical to each other.

Next, a description will be given with regard to countermeasure processing according to the present embodiment against the mismatch between the systems, in a case where the rotary machine 10 rotates at high speed, the induced voltage increases, and it is not possible to set the d-axis electric current to a magnitude sufficient to avoid the voltage saturation because of the limitation in the absolute value of the target d-axis electric current. Here, processing of the electric current command arithmetic unit 70-1 in the present embodiment will be described with reference to FIG. 7.

FIG. 7 is a flowchart illustrating an example of processing of the electric current command arithmetic unit 70-1 in the present embodiment. Note that it is assumed that the electric current command arithmetic unit 70-1 generates the target d-axis electric current $I_{d1}*$ and the target q-axis electric current $I_{q1}*$ from the command value (T*) of the rotary machine 10 in the above-described method.

As illustrated in FIG. 7, first, the electric current command arithmetic unit 70-1 sets "1" to a variable n (n=1), and sets the target q-axis electric current $I_{q1}*$ to a d-axis electric current command value $I_{qt1}[0]$ as an initial value (step S101). Here, the variable n is a variable indicating the number of processing times, and its value is an integer.

Next, the electric current command arithmetic unit 70-1 sets the d-axis electric current $I_{dt1}$, according to the target d-axis electric current $I_{d1}*$ (step S102). The electric current command arithmetic unit 70-1 substitutes the target d-axis electric current $I_{d1}*$ into the d-axis electric current $I_{dt1}$ ($I_{dt1}=I_{d1}*$) to set the d-axis electric current $I_{dt1}$. That is, the electric current command arithmetic unit 70-1 sets the target d-axis electric current $I_{d1}*$ as the d-axis electric current $I_{dt1}$.

Next, the electric current command arithmetic unit 70-1 generates voltages ($V_{dt1}$, $V_{dt1}$) necessary for causing the electric currents ($I_{dt1}$, $I_{qt1}$) to flow, according to the q-axis electric current $I_{qt1}[n-1]$ (step S103). The electric current command arithmetic unit 70-1 generates the voltage $V_{dt1}$ and the voltage $V_{qt1}$, using the following equation (14). Here, the d-axis voltage $V_{dt1}$ and the q-axis voltage $V_{qt1}$ correspond to a first voltage command value that is a command value for the voltage applied to the three-phase windings (u1, v1, w1) of the first system.

[Equation 14]

$$\left.\begin{aligned} V_{dt1} &= R \cdot I_{dt1} - \omega \cdot L \cdot I_{qt1}[n-1] \\ V_{qt1} &= R \cdot I_{qt1}[n-1] + \omega \cdot L \cdot I_{dt1} + \omega \cdot \varphi \end{aligned}\right\} \tag{14}$$

As expressed in the equation (14), the electric current command arithmetic unit 70-1 calculates the d-axis voltage $V_{dt1}$ and the q-axis voltage $V_{qt1}$, using the number of rotations ω of the rotary machine 10, and the resistance value R, the inductance L, and the induced voltage constant φ as the electric constants of the rotary machine 10.

In addition, the q-axis electric current $I_{qt1}[n-1]$ is a previous (n−1th) q-axis electric current $I_{qt1}$ that is one time before, and is calculated in the equation (18) to be described later. Note that in the first time (n=1) of the arithmetic operation for control, $I_{qt1}[0] =I_{q1}*$ is satisfied.

The d-axis electric current $I_{dt1}$ and the q-axis electric current $I_{qt1}$ are values that respectively and finally become the first d-axis electric current command value Id_target1 and the first q-axis electric current command value Iq_target1. Note that in the equation (14), instead of the d-axis electric current $I_{dt1}$ and the q-axis electric current $I_{qt1}$, for example, detected electric currents ($I_{d1}$, $I_{q1}$) calculated in the above-described equation (3) may be used.

Next, the electric current command arithmetic unit 70-1 generates a voltage excess amount $\Delta V_1$, according to the voltages ($V_{dt1}$, $V_{qt1}$) and the DC voltage minimum value $V_{dcm}$ (step S104). The electric current command arithmetic unit 70-1 calculates the voltage excess amount $\Delta V_1$ in the following equation (15). Accordingly, even in a system having a smaller DC voltage, it is possible to expect avoiding a situation in which a desired electric current cannot flow because of the voltage saturation.

[Equation 15]

$$\Delta V_1=(V_{dcm}^2/2)-(V_{dt1}^2+V_{qt1}^2) \tag{15}$$

Next, the electric current command arithmetic unit 70-1 limits the voltage excess amount $\Delta V_1$ using the limit value $V_{x1}$, and sets a value after the limitation as a voltage excess amount $\Delta V_{LM1}$ (step S105). The electric current command arithmetic unit 70-1 generates a value obtained by limiting the voltage excess amount $\Delta V_1$ to a range between an upper limit value $V_{x1}$ and a lower limit value ($-V_{x1}$) using the limit value $V_{x1}$ that has been calculated in the following equation (16), as the voltage excess amount $\Delta V_{LM1}$.

[Equation 16]

$$\left.\begin{aligned} V_{x1} &= \Delta\omega \cdot (L \cdot I_{dt1} + \varphi)/R \\ -V_{x1} &\leq \Delta V_{LM1} \leq V_{x1} \end{aligned}\right\} \tag{16}$$

Next, the electric current command arithmetic unit 70-1 adds the voltage excess amount $\Delta V_{LM1}$ to a previous adjustment amount $\Delta I_{qt1}[n-1]$ to generate a first adjustment amount $\Delta I_{qt1}[n]$ (step S106). The electric current command arithmetic unit 70-1 calculates the first adjustment amount $\Delta I_{qt1}[n]$ in the following equation (17). In a case where the voltage excess amount $\Delta V_{LM1}$ is smaller than "0" ($\Delta V_{LM1} < 0$), the necessary voltage exceeds the power supply voltage of the system on a lower DC voltage side, and therefore, a desired electric current cannot flow. In order to avoid this, the electric current command arithmetic unit 70-1 conducts an adjustment so that an absolute value of the first q-axis electric current command value is smaller than an absolute value of the target q-axis electric current $I_{q1}^*$. Note that the initial value of the first adjustment amount $\Delta I_{qt1}[n]$ is set to "0" ($\Delta I_{qt1}[0]=0$), and the upper limit value is limited to "0" ($\Delta I_{qt1}[n] < 0$).

[Equation 17]

$$\Delta I_{qt1}[n] = \Delta I_{qt1}[n-1] + \Delta V_{LM1} \qquad (17)$$

Next, the electric current command arithmetic unit 70-1 generates a q-axis electric current command value $I_{qt1}[n]$, according to the first adjustment amount $\Delta I_{qt1}[n]$ and the target q-axis electric current $I_{q1}^*$ (step S107). The electric current command arithmetic unit 70-1 adds the first adjustment amount $\Delta I_{qt1}[n]$ that has been subjected to the above arithmetic operation to the target q-axis electric current $I_{q1}^*$ in the following equation (18) to generate the q-axis electric current command value to $I_{qt1}[n]$. The electric current command arithmetic unit 70-1 makes the absolute value of the q-axis electric current command value to $I_{qt1}[n]$ smaller than the absolute value of the target q-axis electric current $I_{q1}^*$ in the following equation (18), so as to avoid the voltage excess caused by the limitation in the DC voltage in the above-described equations (14) and (15).

[Equation 18]

$$\left. \begin{array}{r} I_{qt1}[n] = I_{q1}^* + \Delta I_{qt1}[n] \ (I_{q1}^* > 0) \\ I_{qt1}[n] = I_{q1}^* - \Delta I_{qt1}[n] \ (I_{q1}^* < 0) \\ I_{qt1}[n] = 0 \ (I_{q1}^* = 0) \end{array} \right\} \qquad (18)$$

Specifically, in a case where the first voltage command value ($V_{dt1}^2 + V_{qt1}^2$) is larger than a value ($V_{dcm}^2/2$) determined by the DC voltage minimum value $V_{dcm}$ from the equations (15) and (17), the electric current command arithmetic unit 70-1 performs correction so that the first adjustment amount $\Delta I_{qt1}[n]$ changes in a negative direction and the absolute value of the first q-axis electric current command value to $I_{qt1}[n]$ decreases. In addition, in a case where the first voltage command value ($V_{dt1}^2 + V_{qt1}^2$) is smaller than a value ($V_{dcm}^2/2$) determined by the DC voltage minimum value $V_{dcm}$ (that is, in a case where the power supply voltage is sufficiently large), the electric current command arithmetic unit 70-1 performs correction so that the first adjustment amount $\Delta I_{qt1}[n]$ changes in a positive direction and the absolute value of the first q-axis electric current command value $I_{qt1}[n]$ increases. Here, the value ($V_{dcm}^2/2$) is an example of a comparison value according to the DC voltage minimum value $V_{dcm}$.

Next, the electric current command arithmetic unit 70-1 sets the d-axis electric current command value $I_{dt1}$ to the first d-axis electric current command value Id_target1, and outputs the q-axis electric current command value to $I_{qt1}[n]$ as the first q-axis electric current command value Iq_target1 (step S108). That is, the electric current command arithmetic unit 70-1 sets the first d-axis electric current command value Id_target1=$I_{dt1}$, and also sets the first q-axis electric current command value Iq_target1=$I_{qt1}[n]$.

Next, the electric current command arithmetic unit 70-1 adds "1" to the variable n(n=n+1) to update the variable n (step S109). After the processing of step S109, the electric current command arithmetic unit 70-1 returns the processing to step S102.

In addition, similarly to the electric current command arithmetic unit 70-1, the electric current command arithmetic unit 70-2 of the second system generates the target d-axis electric current $I_{d2}^*$ and the target q-axis electric current $I_{q2}^*$ from the command value (T*) of the rotary machine 10, performs processing similar to the above-described processing of FIG. 7, and generates the second d-axis electric current command value Id_target2 and the second q-axis electric current command value Iq_target2.

As described heretofore, the rotary machine control device 1 according to the present embodiment includes the inverter 5-1 (the first inverter), the inverter 5-2 (the second inverter), the controller 7-1 (the first controller), and the controller 7-2 (the second controller). The inverter 5-1 applies an AC voltage to the three-phase windings (u1, v1, w1) of the first system of the rotary machine 10, according to the first DC voltage Vdc1 that has been output from the DC power supply 3-1 (the first DC power supply). The inverter 5-2 applies an AC voltage to the three-phase windings (u2, v2, w2) of the second system of the rotary machine 10, according to the second DC voltage Vdc2 that has been output from the DC power supply 3-2 (the second DC power supply). The controller 7-1 generates the first d-axis electric current command value Id_target1 (the command value of the d-axis electric current of the first system), according to the DC voltage minimum value $V_{dcm}$, which is the lower one of the first DC voltage Vdc1 and the second DC voltage Vdc2, and the command value of the rotary machine 10. In addition, the controller 7-1 generates the first q-axis electric current command value Iq_target1 (the command value of the q-axis electric current of the first system), according to the DC voltage minimum value $V_{dcm}$ and the first d-axis electric current command value Id_target1. The controller 7-1 outputs first control signals GS11 to GS16 for causing the inverter 5-1 to apply an AC voltage to the three-phase windings (u1, v1, w1) of the first system, according to the first d-axis electric current command value Id_target1 and the first q-axis electric current command value Iq_target1 that have been generated. In addition, the controller 7-2 generates the second d-axis electric current command value Id_target2 (the command value of the d-axis electric current of the second system), according to the DC voltage minimum value $V_{dcm}$ and the command value of rotary machine 10. Further, the controller 7-2 generates the second q-axis electric current command value Iq_target2 (the command value of the q-axis electric current of the second system), according to the DC voltage minimum value $V_{dcm}$ and the second d-axis electric current command value Id_target2. The controller 7-2 outputs the second control signals GS21 to GS26 for causing the inverter 5-2 to apply the AC voltage to the three-phase windings (u2, v2, w2) of the second system, according to the second d-axis electric current command value Id_target2 and the second q-axis electric current command value Iq_target2 that have been generated.

Accordingly, the rotary machine control device 1 according to the present embodiment generates the electric current command values (the first d-axis electric current command value Id_target1, the first q-axis electric current command value Iq_target1, the second d-axis electric current command value Id_target2, and the second q-axis electric current command value Iq_target2), according to the value on a lower DC voltage side (the DC voltage minimum value $V_{dcm}$) in the same generation methods in the first system and the second system. Therefore, the rotary machine control device 1 according to the present embodiment is capable of making the electric current command values of the two systems identical to each other, and thus is capable of making the electric currents of the two systems identical to each other, while avoiding the situation in which a desired electric current cannot flow because of the limitation in the DC voltage. Therefore, the rotary machine control device 1 according to the present embodiment is capable of reducing the mismatch between the systems, even in a case where a difference occurs between the DC voltages output from the DC power supplies (3-1, 3-2) of the plurality of systems that control the rotary machine 10.

In addition, in the rotary machine control device 1 according to the present embodiment, for example, also when the rotary machine 10 rotates at high speed, the electric currents caused to flow in the two systems can be matched with each other. Therefore, the rotary machine 10 can be controlled stably, and the plurality of systems can work in cooperation appropriately, while avoiding the mismatch between the systems.

Further, in the rotary machine control device 1 according to the present embodiment, in a case where the first voltage command value $(V_{dt1}{}^2+V_{qt1}{}^2)$, which is a command value for the voltage applied to the three-phase windings (u1, v1, w1) of the first system, is larger than a comparison value $(V_{dcm}{}^2/2)$ according to the DC voltage minimum value $V_{dcm}$, the controller 7-1 corrects the first q-axis electric current command value Iq_target1 to decrease. In a case where the first voltage command value $(V_{dt1}{}^2+V_{qt1}{}^2)$ is smaller than the comparison value $(V_{dcm}{}^2/2)$, the controller 7-1 corrects the first q-axis electric current command value Iq_target1 to increase. In addition, in a case where the second voltage command value $(V_{dt2}{}^2+V_{qt2}{}^2)$, which is a command value for the voltage applied to the three-phase windings (u2, v2, w2) of the second system, is larger than the comparison value $(V_{dcm}{}^2/2)$ according to the DC voltage minimum value $V_{dcm}$, the controller 7-2 corrects the second q-axis electric current command value Iq_target2 to decrease. In a case where the second voltage command value $(V_{dt2}{}^2+V_{qt2}{}^2)$ is smaller than the comparison value $(V_{dcm}{}^2/2)$, the controller 7-2 corrects the second q-axis electric current command value Iq_target2 to increase.

Accordingly, the rotary machine control device 1 according to the present embodiment is capable of appropriately adjusting the first q-axis electric current command value Iq_target1 in accordance with a relationship between the DC voltage minimum value $V_{dcm}$ and the first voltage command value $(V_{dt1}{}^2+V_{qt1}{}^2)$, and is also capable of appropriately adjusting the second q-axis electric current command value Iq_target2 in accordance with a relationship between the DC voltage minimum value $V_{dcm}$ and the second voltage command value $(V_{dt2}{}^2+V_{qt2}{}^2)$. Therefore, the rotary machine control device 1 according to the present embodiment is capable of causing a desired electric current to flow, while avoiding the influence of the voltage saturation. In addition, the 10 rotary machine control device 1 according to the present embodiment generates the q-axis electric current command value in an identical method in the first system and the second system using the DC voltage minimum value $V_{dcm}$, is thus capable of setting an electric current in accordance with the system on a lower DC voltage side of the DC power supply 3-1 and the DC power supply 3-2, and is capable of making the electric currents of the two systems identical to each other.

Further, in the present embodiment, the controller 7-1 generates the first voltage command value (for example, the d-axis voltage $V_{dt1}$ and the q-axis voltage $V_{qt1}$), according to the d-axis electric current $I_{dt1}$ of the first system and the q-axis electric current $I_{qt1}$ of the first system, the rotational speed (for example, the number of rotations ω) of the rotary machine 10, and the electric constants (for example, the resistance value R, the inductance L, the induced voltage constant φ, and the like) of the rotary machine 10 (see the above-described equation (14)). In addition, the controller 7-2 generates the second voltage command value (for example, the d-axis voltage $V_{dt2}$ and the q-axis voltage $V_{qt2}$), according to the d-axis electric current $I_{dt2}$ of the second system and the q-axis electric current $I_{qt2}$ of the second system, the rotational speed (for example, the number of rotations ω) of the rotary machine 10, and the electric constants of the rotary machine 10 (for example, the resistance value R, the inductance L, and the induced voltage constant φ).

Accordingly, the rotary machine control device 1 according to the present embodiment is capable of causing an appropriate electric current to flow to the rotary machine 10 in accordance with the first voltage command values (for example, the d-axis voltage $V_{dt1}$ and the q-axis voltage $V_{qt1}$) and the second voltage command values (for example, the d-axis voltage $V_{dt2}$ and the and q-axis voltage $V_{qt2}$) that have been generated.

In addition, in the present embodiment, the controller 7-1 includes the first CPU, and the controller 7-2 includes the second CPU. The first CPU transmits the first DC voltage Vdc1 (=Vdc1s) to the second CPU, and the second CPU transmits the second DC voltage Vdc2 (=Vdc2s) to the first CPU.

Accordingly, in the rotary machine control device 1 according to the present embodiment, the two independent CPUs perform processing. Therefore, for example, even when one of the systems fails, the other one of the systems is capable of continuing the control of the rotary machine 10.

Note that the controller 7-1 (the electric current command arithmetic unit 70-1) and the controller 7-2 (the electric current command arithmetic unit 70-2) may perform the above-described processing of FIG. 7 only in the system on a high DC voltage side. In this case, in the system on a low DC voltage side of the controller 7-1 (the electric current command arithmetic unit 70-1) and the controller 7-2 (the electric current command arithmetic unit 70-2), the target d-axis electric current value is set without change to the d-axis electric current command value, and the target q-axis electric current value is set without change to the q-axis electric current command value. That is, for example, in a case where the DC voltage of the first system is low, the controller 7-1 (the electric current command arithmetic unit 70-1) sets the target d-axis electric current $I_{d1}{}^*$ to the first d-axis electric current command value Id_target1, and sets the target q-axis electric current $I_{q1}{}^*$ to the first q-axis electric current command value Iq_target1.

[Second Embodiment]

Next, a rotary machine control device la according to a second embodiment will be described with reference to the drawings. In the present embodiment, a description will be given with regard to a modification in which the rotary machine control device la limits a d-axis electric current command value or a q-axis electric current command value, according to an integrated value of the electric currents, which respectively flow through the three-phase windings of each system.

Figure 8:
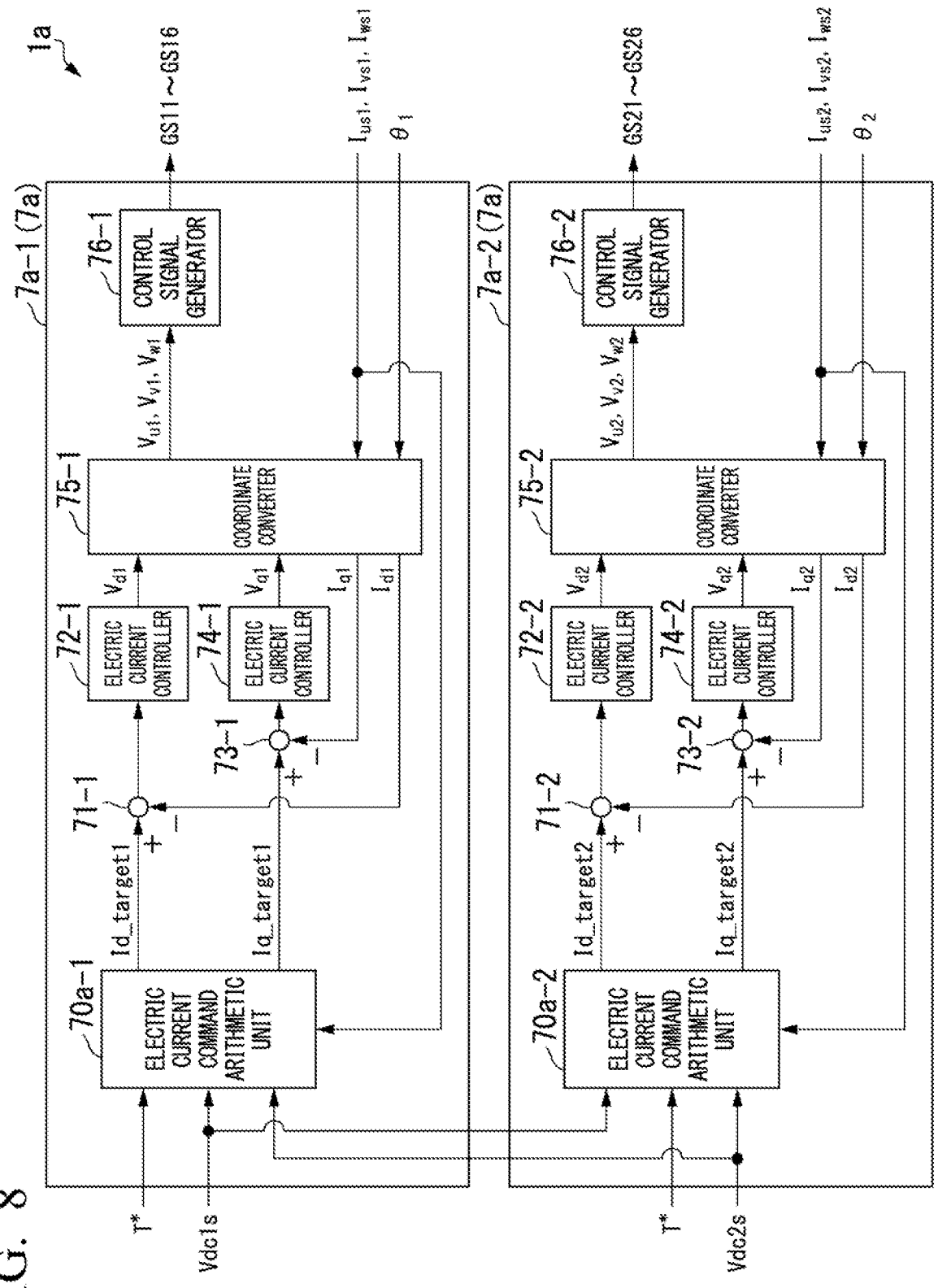
FIG. 8 is a block diagram illustrating an example of controllers in two systems of a rotary machine control device according to a second embodiment.

FIG. 8 is a block diagram illustrating an example of the controllers 7a in two systems of the rotary machine control device la according to the second embodiment.

As illustrated in FIG. 8, the rotary machine control device 1a includes a controller 7a-1 and a controller 7a-2. Note that the entire constitution of the rotary machine control device la is similar to that of the first embodiment illustrated in FIG. 1, except that the controller 7a-1 and the controller 7a-2 are provided instead of the controller 7-1 and the controller 7-2, and thus its description is omitted here.

In addition, in FIG. 8, the same constitutions as those of the first embodiment illustrated in FIG. 2 are denoted by the same reference numbers, and the descriptions will be omitted.

The controller 7a-1 (an example of the first controller) includes an electric current command arithmetic unit 70a-1, a subtractor 71-1, an electric current controller 72-1, a subtractor 73-1, an electric current controller 74-1, a coordinate converter 75-1, and a control signal generator 76-1. In the present embodiment, the controller 7a-1 limits the first d-axis electric current command value Id_target1 or the first q-axis electric current command value Iq_target1, according to first detected electric currents (the electric current value $I_{us1}$, the electric current value $I_{vs1}$, and the electric current value $I_{ws1}$).

In a case where an absolute value of the first d-axis electric current command value Id_target1 or the first q-axis electric current command value Iq_target1 is large, the electric current of the rotary machine 10 increases, and the calorific value increases, accordingly. For this reason, in consideration of the heat generation of the rotary machine 10, when a large electric current is continuously caused to flow, the electric current command arithmetic unit 70a-1 in the present embodiment limits the first d-axis electric current command value Id_target1 or the first q-axis electric current command value Iq_target1 so as to reduce the calorific value.

The electric current command arithmetic unit 70a-1 limits the first d-axis electric current command value Id_target1 or the first q-axis electric current command value Iq_target1, according to the integrated value of the first electric currents, which are the electric currents that respectively flow through the three-phase windings (u1, v1, w1) of the first system. The electric current command arithmetic unit 70a-1 calculates an integrated value of electric current values It1, which are the first electric currents, according to the detected electric currents (the electric current value $I_{us1}$, the electric current value $I_{vs1}$, and the electric current value $I_{ws1}$) that have been detected by electric current detector 6-1, and limits the first d-axis electric current command value Id_target1 or the first q-axis electric current command value Iq_target1, according to the integrated value of the electric current values It1 that has been calculated.

Note that the electric current command arithmetic unit 70a-1 has an electric current limit map that is a reference table in which the integrated value of the electric current values It1 and a limit value IL1 are associated with each other. Here, the electric current value It1 is, for example, a square root of a sum of squares of the respective detected electric currents (the electric current value $I_{us1}$, the electric current value $I_{vs1}$, and the electric current value $I_{ws1}$). In addition, the electric current limit map is set so that the limit value IL1 decreases, as the integrated value of the electric current values It1 increases.

The electric current command arithmetic unit 70a-1 calculates the limit value IL1, with the integrated value of the electric current values It1 as an input, from the electric current limit map that has been set beforehand. The electric current command arithmetic unit 70a-1 limits the absolute value of the first d-axis electric current command value Id_target1 and the absolute value of the first q-axis electric current command value Iq_target1 to be small so that the electric current value It1 is smaller than the limit value IL1 The other functions of the electric current command arithmetic unit 70a-1 are similar to those of the electric current command arithmetic unit 70-1 in the above-described first embodiment.

The controller 7a-2 (an example of the second controller) includes an electric current command arithmetic unit 70a-2, a subtractor 71-2, an electric current controller 72-2, a subtractor 73-2, an electric current controller 74-2, a coordinate converter 75-2, and a control signal generator 76-2. Similarly to the above-described controller 7a-1, the controller 7a-2 limits a second d-axis electric current command value Id_target2 or a second q-axis electric current command value Iq_target2, according to second detected electric currents (the electric current value $I_{us2}$, the electric current value $I_{vs2}$, and the electric current value $I_{ws2}$).

The electric current command arithmetic unit 70a-2 limits the second d-axis electric current command value Id_target2 or the second q-axis electric current command value Iq_target2, according to an integrated value of the second electric currents, which are the electric currents that respectively flow through the three-phase windings (u2, v2, w2) of the second system. The electric current command arithmetic unit 70a-2 calculates an integrated value of the electric current values It2, which are the second electric currents, according to the detected electric currents (the electric current value $I_{us2}$, the electric current value $I_{vs2}$, and the electric current value $I_{ws2}$) that have been detected by electric current detector 6-2, and limits the second d-axis electric current command value Id_target2 or the second q-axis electric current command value Iq_target2, according to the integrated value of the electric current values It2 that has been calculated.

Note that the electric current command arithmetic unit 70a-2 has an electric current limit map that is a reference table in which the integrated value of the electric current values It2 and the limit value IL2 are associated with each other. Here the electric current value It2 is, for example, a square root of a sum of squares of the respective detected electric currents (the electric current value $I_{us2}$, the electric current value $I_{vs2}$, and the electric current value $I_{ws2}$). In addition, the electric current limit map is set so that the limit value IL2 decreases, as the integrated value of the electric current values It2 increases.

The electric current command arithmetic unit 70a-2 calculates the limit value IL2, with the integrated value of the electric current values It2 as an input, from the electric current limit map that has been set beforehand. The electric current command arithmetic unit 70a-2 limits the absolute value of the second d-axis electric current command value Id_target2 and the absolute value of the second q-axis electric current command value Iq_target2 to be small so that the electric current value It2 is smaller than the limit value IL2. The other functions of the electric current command arithmetic unit 70a-2 are similar to those of the electric current command arithmetic unit 70-1 in the above-described first embodiment.

As described heretofore, the rotary machine control device 1a according to the present embodiment includes the controller 7a-1 and the controller 7a-2. The controller 7a-1 limits the first d-axis electric current command value Id_target1 or the first q-axis electric current command value Iq_target1, according to the integrated value (a value obtained by integrating the electric current values It1) of the first electric currents, which are electric currents that respectively flow through the three-phase windings (u1, v1, w1) of the first system. In addition, the controller 7a-2 limits the second d-axis electric current command value Id_target2 or the second q-axis electric current command value Iq_target2, according to the integrated value (a value obtained by integrating the electric current values It2) of the second electric currents, which are electric currents that respectively flow through the three-phase windings (u2, v2, w2) of the second system.

Accordingly, the rotary machine control device 1a according to the present embodiment is capable of reducing the calorific value, by limiting the electric current of the rotary machine 10 to be small, when the detected electric current continuously increases.

In addition, the rotary machine control device 1a according to the present embodiment includes the electric current detector 6-1 (the first electric current detector) and the electric current detector 6-2 (the second electric current detector). The electric current detector 6-1 detects electric currents that respectively flow through the three-phase windings (u1, v1, w1) of the first system. The electric current detector 6-2 detects electric currents that respectively flow through the three-phase windings (u2, v2, w2) of the second system. The controller 7a-1 calculates an integrated value of the first electric currents, according to the detected electric currents that have been detected by the electric current detector 6-1, and limits the first d-axis electric current command value Id_target1 or the first q-axis electric current command value Iq_target1, according to the integrated value of the first electric currents that has been calculated. The controller 7a-2 calculates an integrated value of the second electric currents, according to the detected electric currents that have been detected by the electric current detector 6-2, and limits the second d-axis electric current command value Id_target2 or the second q-axis electric current command value Iq_target2, according to the integrated value of the second electric currents that has been calculated.

Accordingly, using the electric current detector 6-1 and the electric current detector 6-2, the rotary machine control device 1a according to the present embodiment is capable of reducing the calorific value, by limiting the electric current of the rotary machine 10 to be small, when the detected electric current continuously increases.

Note that the electric current command arithmetic unit 70a-1 may determine the limit value IL1 using, for example, the first d-axis electric current command value Id_target1 and the first q-axis electric current command value Iq_target1, instead of the detected electric currents (the electric current value $I_{us1}$, the electric current value $I_{vs1}$, and the electric current value $I_{ws1}$) that have been detected by the electric current detector 6-1. In this case, the electric current command arithmetic unit 70a-1 calculates the electric current value It1 from the square root of the sum of the squares of the first d-axis electric current command value Id_target1 and the square of the first q-axis electric current command value Iq_target1, and calculates the limit value IL1, with the integrated value of the electric current values It1 as an input, from the electric current limit map that has been set beforehand.

The electric current command arithmetic unit 70a-2 may determine the limit value IL2 using, for example, the second d-axis electric current command value Id_target2 and the second q-axis electric current command value Iq_target2, instead of the detected electric currents (the electric current value $I_{us2}$, the electric current value $I_{vs2}$, and the electric current value $I_{ws2}$) that have been detected by the electric current detector 6-2. In this case, the electric current command arithmetic unit 70a-2 calculates the electric current value It2 from the square root of the sum of the squares of the second d-axis electric current command value Id_target2 and the square of the second q-axis electric current command value Iq_target2, and calculates the limit value IL2, with the integrated value of the electric current values It2 as an input, from the electric current limit map that has been set beforehand.

In this manner, in the present embodiment, the controller 7a-1 may calculate the integrated value of the first electric currents It1, according to the first d-axis electric current command value Id_target1 and the first q-axis electric current command value Iq_target1, and may limit the first d-axis electric current command value Id_target1 or the first q-axis electric current command value Iq_target 1, according to the integrated value of the first electric currents It1 that has been calculated. The controller 7a-2 may calculate the integrated value of the second electric currents It2, according to the second d-axis electric current command value Id_target2 and the second q-axis electric current command value Iq_target2, and may limit the second d-axis electric current command value Id_target2 or the second q-axis electric current command value Iq_target2, according to the integrated value of the second electric currents It2 that has been calculated.

Accordingly, the rotary machine control device 1a according to the present embodiment uses the first d-axis electric current command value Id_target1 and the first q-axis electric current command value Iq_target1, and the second d-axis electric current command value Id_target2 and the second q-axis electric current command value Iq_target2, and is capable of limiting the electric current of the rotary machine 10 to be small and reducing the calorific value, when the electric current that flows continuously increases.

[Third Embodiment]

Next, a rotary machine control device 1b according to a third embodiment will be described with reference to the drawings. In the present embodiment, a description will be given with regard to a modification in which the rotary machine control device 1b limits the d-axis electric current command value or the q-axis electric current command value, according to an electric current of a direct-current part of each system.

Figure 9:
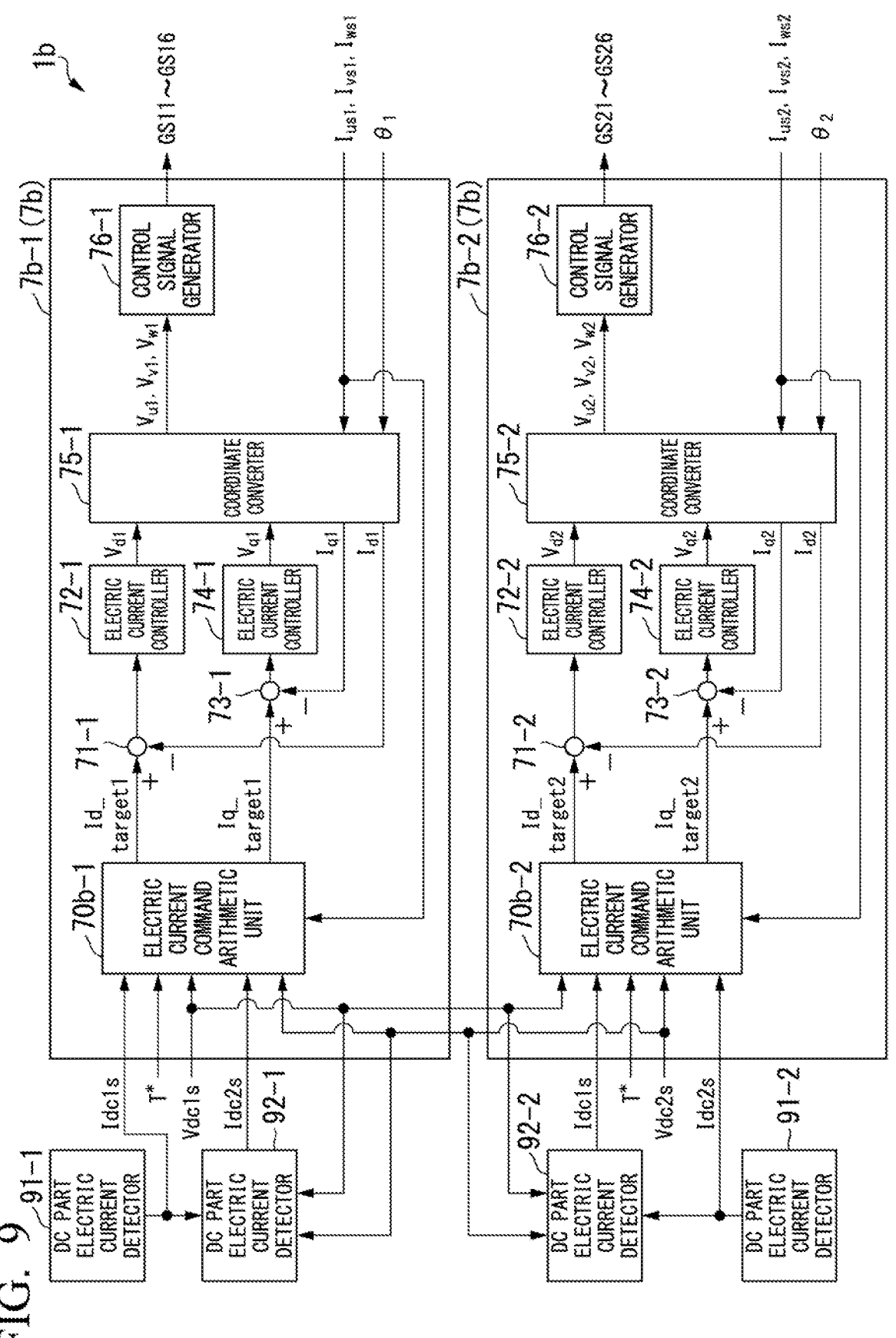
FIG. 9 is a block diagram illustrating an example of controllers in two systems of a rotary machine control device according to a third embodiment.

FIG. 9 is a block diagram illustrating an example of controllers 7b in two systems of the rotary machine control device 1b according to the third embodiment.

As illustrated in FIG. 9, the rotary machine control device 1b includes a controller 7b-1, a controller 7b-2, a DC part electric current detector 91-1, a DC part electric current detector 92-1, a DC part electric current detector 91-2, and a DC part electric current detector 92-2. Note that the entire constitution of the rotary machine control device 1b is similar to that in the first embodiment illustrated in FIG. 1 except that the controller 7b-1, the controller 7b-2, the DC part electric current detector 91-1, the DC part electric current detector 92-1, the DC part electric current detector 91-2, and the DC part electric current detector 92-2 are included, instead of the controller 7-1 and the controller 7-2, and thus its description is omitted here.

In addition, in FIG. 9, the same constitutions as those of the first embodiment illustrated in FIG. 2 are denoted by the same reference numbers, and the descriptions will be omitted.

The DC part electric current detector 91-1 (an example of a first DC part electric current detector) detects a first DC part electric current Idc1s that is an electric current output from the DC power supply 3-1 to the inverter 5-1. Here, the first DC part electric current Idc1*s* can also be estimated in an arithmetic operation of the following equation (19).

[Equation 19]

$$Idc1s = du1 \times Iu1 + dv1 \times Iv1 + dw1 \times Iw1 \quad (19)$$

Note that the DC part electric current detector 91-1 or the controller 7*b*-1 may estimate the first DC part electric current Idc1*s*, using the equation (19).

The DC part electric current detector 92-1 (an example of a second DC part electric current detector) detects a second DC part electric current Idc2*s*, according to the first DC part electric current Idc1*s* that has been detected by the DC part electric current detector 91-1, the first DC voltage Vdc1*s*, and the second DC voltage Vdc2*s*. The DC part electric current detector 92-1 detects the second DC part electric current Idc2*s*, using the following equation (20).

[Equation 20]

$$Idc2s = Vdc1s \times Idc1s / Vdc2s \quad (20)$$

The controller 7*b*-1 (an example of the first controller) limits the first d-axis electric current command value Id_target1 or the first q-axis electric current command value Iq_target1, according to the first DC part electric current Idc1*s*, which is an electric current output from the DC power supply 3-1 to the inverter 5-1, and the second DC part electric current Idc2*s*, which is an electric current output from the DC power supply 3-2 to the inverter 5-2. The controller 7*b*-1 includes an electric current command arithmetic unit 70*b*-1, a subtractor 71-1, an electric current controller 72-1, a subtractor 73-1, an electric current controller 74-1, a coordinate converter 75-1, and a control signal generator 76-1.

In a case where an absolute value of the first d-axis electric current command value Id_target1 or the first q-axis electric current command value Iq_target1 is large, the above-described first DC part electric current Idc1*s* increases. Accordingly, in the case where the absolute value of the first d-axis electric current command value Id_target1 or the first q-axis electric current command value Iq_target1 is large, the electric current caused to flow to the rotary machine 10 increases, and the calorific value increases, accordingly. Therefore, in consideration of the calorific value of the rotary machine 10, the electric current command arithmetic unit 70*b*-1 limits the first d-axis electric current command value Id_target1 or the first q-axis electric current command value Iq_target1 so that the calorific value decreases, when a large electric current is continuously caused to flow.

The electric current command arithmetic unit 70*b*-1 determines the limit value IL1, according to, for example, an integrated value of a larger one of the first DC part electric current Idc1*s* and the second DC part electric current Idc2*s*. Note that the electric current command arithmetic unit 70*b*-1 has an electric current limit map that is a reference table in which the integrated value of the larger one of the first DC part electric current Idc1*s* and the second DC part electric current Idc2*s* is associated with the limit value IL1. Here, the electric current limit map is set so that the limit value IL1 decreases, as the above-described integrated value increases.

For example, the electric current command arithmetic unit 70*b*-1 calculates an integrated value of the larger one of the first DC part electric current Idc1*s* that has been detected by the DC part electric current detector 91-1 and the second DC part electric current Idc2*s* that has been detected by the DC part electric current detector 92-1. The electric current command arithmetic unit 70*b*-1 calculates the limit value IL1, with the integrated value that has been calculated as an input, from the electric current limit map that has been set beforehand. The electric current command arithmetic unit 70*b*-1 limits the absolute value of the first d-axis electric current command value Id_target1 and the absolute value of the first q-axis electric current command value Iq_target1 to be small so that the electric current values It1, which respectively flow through the three-phase windings (u1, v1, w1) of the first system, are smaller than the limit value IL1. The other functions of the electric current command arithmetic unit 70*b*-1 are similar to those of the electric current command arithmetic unit 70-1 in the first embodiment or the electric current command arithmetic unit 70*a*-1 in the second embodiment described above.

The DC part electric current detector 91-2 (an example of the second DC part electric current detector) detects a second DC part electric current Idc2*s*, which is an electric current output from the DC power supply 3-2 to the inverter 5-2. Here, the second DC part electric current Idc2*s* can also be estimated in an arithmetic operation of the following equation (21).

[Equation 21]

$$Idcs2 = du2 \times Iu2 + dv2 \times Iv2 + dw2 \times Iw2 \quad (21)$$

Note that the DC part electric current detector 91-2 or the controller 7*b*-2 may estimate the second DC part electric current Idc2*s*, using the equation (21).

The DC part electric current detector 92-2 (an example of the first DC part electric current detector) detects a first DC part electric current Idc1*s*, according to the second DC part electric current Idc2*s* that has been detected by the DC part electric current detector 91-2, the first DC voltage Vdc1*s*, and the second DC voltage Vdc2*s*. The DC part electric current detector 92-2 detects the first DC part electric current Idc1*s*, using the following equation (22).

[Equation 22]

$$Idc1s = Vdc2s \times Idc2s / Vdc1s \quad (22)$$

The controller 7*b*-2 (an example of the second controller) limits the second d-axis electric current command value Id_target2 or the second q-axis electric current command value Iq_target2, according to the first DC part electric current Idc1*s*, which is an electric current output from the DC power supply 3-1 to the inverter 5-1, and the second DC part electric current Idc2*s*, which is an electric current output from the DC power supply 3-2 to the inverter 5-2. The controller 7*b*-2 includes an electric current command arithmetic unit 70*b*-2, a subtractor 71-2, an electric current controller 72-2, a subtractor 73-2, an electric current controller 74-2, a coordinate converter 75-2, and a control signal generator 76-2.

In a case where an absolute value of the second d-axis electric current command value Id_target2 or the second q-axis electric current command value Iq_target2 is large, the above-described second DC part electric current Idc2*s* increases. Accordingly, in the case where the absolute value of the second d-axis electric current command value Id_target2 or the second q-axis electric current command value Iq_target2 is large, the electric current caused to flow to the rotary machine 10 increases, and the calorific value increases, accordingly. Therefore, in consideration of the calorific value of the rotary machine 10, the electric current command arithmetic unit 70*b*-2 limits the second d-axis electric current command value Id_target2 or the second q-axis electric current command value Iq_target2 so that the calorific value decreases, when a large electric current is continuously caused to flow.

For example, the electric current command arithmetic unit 70*b*-2 determines the limit value IL2, according to the integrated value of a larger one of the first DC part electric current Idc1*s* and the second DC part electric current Idc2*s*. Note that the electric current command arithmetic unit 70*b*-2 has an electric current limit map that is a reference table in which the integrated value of the larger one of the first DC part electric current Idc1*s* and the second DC part electric current Idc2*s* is associated with the limit value IL2. Here, the electric current limit map is set so that the limit value IL2 decreases, as the above-described integrated value increases.

For example, the electric current command arithmetic unit 70*b*-2 calculates an integrated value of the larger one of the second DC part electric current Idc2*s* that has been detected by the DC part electric current detector 91-2 and the first DC part electric current Idc1*s* that has been detected by the DC part electric current detector 92-2. The electric current command arithmetic unit 70*b*-2 calculates the limit value IL2, with the integrated value that has been calculated as an input, from the electric current limit map that has been set beforehand. The electric current command arithmetic unit 70*b*-2 limits the absolute value of the second d-axis electric current command value Id_target2 and the absolute value of the second q-axis electric current command value Iq_target2 to be small so that the electric current values It2, which respectively flow through the three-phase windings (u2, v2, w2) of the second system, are smaller than the limit value IL2. The other functions of the electric current command arithmetic unit 70*b*-2 are similar to those of the electric current command arithmetic unit 70-2 in the first embodiment or the electric current command arithmetic unit 70*a*-2 in the second embodiment described above.

As described heretofore, the rotary machine control device 1*b* according to the present embodiment includes the controller 7*b*-1 and the controller 7*b*-2. The controller 7*b*-1 limits the first d-axis electric current command value Id_target1 or the first q-axis electric current command value Iq_target1, according to the integrated value of the larger one of the first DC part electric current Idc1*s*, which is an electric current output from the DC power supply 3-1 to the inverter 5-1, and the second DC part electric current Idc2*s*, which is an electric current output from the DC power supply 3-2 to the inverter 5-2. The controller 7*b*-2 limits the second d-axis electric current command value Id_target2 or the second q-axis electric current command value Iq_target2, according to the integrated value of the larger one of the first DC part electric current Idc1*s* and the second DC part electric current Idc2*s*.

Accordingly, the rotary machine control device 1*b* according to the present embodiment limits the electric current command value of each system, according to the first DC part electric current Idc1*s* and the second DC part electric current Idc2*s*. Therefore, even when the absolute value of the electric current command value of each system continuously increases, the electric current caused to flow to the rotary machine 10 can be reduced, and the calorific value of the rotary machine 10 can be reduced.

In addition, in the rotary machine control device 1*b* according to the present embodiment, the electric current command values in the respective systems caused by the first DC part electric current Idc1*s* and the second DC part electric current Idc2*s* are equally limited. Therefore, in the rotary machine control device 1*b* according to the present embodiment, the first d-axis electric current command value Id_target1 and the second d-axis electric current command value Id_target2 match each other, and the first q-axis electric current command value Iq_target1 and the second q-axis electric current command value Iq_target2 match each other, and thus the mismatch between the systems can be suppressed.

Further, in the present embodiment, the controller 7*b*-1 determines the larger one of the DC part electric current, according to the second DC part electric current Idc2*s* that has been estimated, according to the first DC voltage Vdc1*s*, the second DC voltage Vdc2*s*, and the first DC part electric current Idc1*s*. The controller 7*b*-2 determines the larger one of the DC part electric current, according to the first DC part electric current Idc1*s* that has been estimated, according to the first DC voltage Vdc1*s*, the second DC voltage Vdc2*s*, and the second DC part electric current Idc2*s*.

Accordingly, the rotary machine control device 1*b* according to the present embodiment estimates the DC part electric current of the other system, and thus has an effect of eliminating the need for a sensor or wiring for newly detecting an electric current in the own system.

Note that in the above-described present embodiment, the description has been given with regard to an example in which the rotary machine control device 1*b* includes the DC part electric current detector 91-1, the DC part electric current detector 92-1, the DC part electric current detector 91-2, and the DC part electric current detector 92-2. However, these functions may be included in the controller 7*b*-1 and the controller 7*b*-2. In addition, the first DC part electric current Idc1*s* and the second DC part electric current Idc2*s* may be detected using an electric current detection resistance (shunt resistance) or the like.

[Fourth Embodiment]

Next, an electric power steering device 100 according to a fourth embodiment will be described with reference to the drawings.

Figure 10:
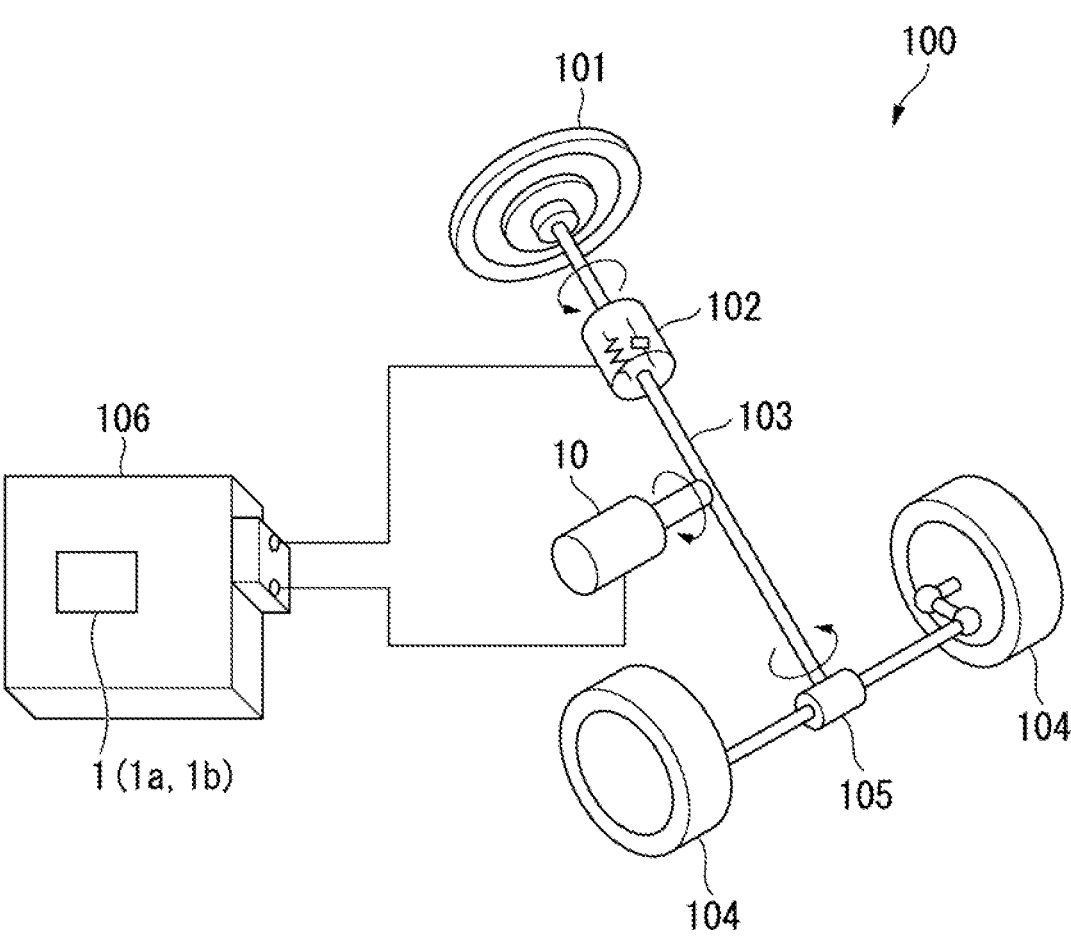
FIG. 10 is a block diagram illustrating an example of an electric power steering device according to a fourth embodiment.

FIG. 10 is a block diagram illustrating an example of an electric power steering device 100 according to the fourth embodiment.

As illustrated in FIG. 10, the electric power steering device 100 includes the rotary machine 10, a steering wheel 101, a torque sensor 102, a steering shaft 103, wheels 104, a rack and pinion gear 105, and a control device 106. In addition, the control device 106 includes the above-described rotary machine control device 1 (1*a*, 1*b*).

The torque sensor 102 detects steering torque of a driver (not illustrated).

The wheels 104 are, for example, wheels to be steered on a vehicle such as an automobile.

In the electric power steering device 100, the steering torque applied from the driver to the steering wheel 101 is transmitted through a torsion bar of the torque sensor 102 and the steering shaft 103 to a rack via the rack and pinion gear 105. Accordingly, the electric power steering device 100 steers the wheels 104.

Further, the rotary machine 10 is driven by the rotary machine control device 1 (1*a*, 1*b*) of the control device 106, and generates assist force as an output. The assist force is transmitted to the steering shaft 103 to reduce the steering torque applied by the driver during steering. The control device 106 calculates an assist command for adjusting the assist force, according to the steering torque of the driver that has been detected by the torque sensor 102. For example, the control device 106 calculates the assist command as a value proportional to the steering torque of the driver. Furthermore, the control device 106 sets an assist command as a torque command to be a command value of the rotary machine 10.

As described heretofore, the electric power steering device 100 according to the present embodiment includes the above-described rotary machine control device 1 (1*a*, 1*b*), the rotary machine 10, which assists steering, and the torque sensor 102, which detects the steering torque of the steering. The rotary machine control device 1 (1*a*, 1*b*) controls the rotary machine 10 with a steering assist command in accordance with the steering torque that has been detected by the torque sensor 102, as a command value of the rotary machine 10.

Accordingly, the electric power steering device 100 according to the present embodiment has similar effects to those of the above-described rotary machine control device 1 (1*a*, 1*b*). Even in a case where a difference occurs between the DC voltages output from the DC power supplies (3-1, 3-2) of the plurality of systems that control the rotary machine 10, the mismatch between the systems can be reduced. In addition, the electric power steering device 100 according to the present embodiment is capable of obtaining the assist torque in accordance with the steering of the driver from the rotary machine 10, and in addition, is capable of stably controlling the rotary machine with the electric currents in two systems, so that the electric power steering device that enables comfortable steering is achievable.

Note that the present disclosure is not limited to the above embodiments, and can be modified without departing from the gist of the present disclosure.

For example, in each of the above embodiments, the command value of the rotary machine 10 has been described as the torque command, but there is no intention to be limited to this. For example, the command value of the rotary machine 10 may be used as a speed command. In such a case, the electric current command arithmetic unit 70 (70*a*, 70*b*) constitutes a feedback control system that causes the rotational speed of the rotary machine 10 to follow the target speed, and performs arithmetic operations of the target d-axis electric current $I_{d01}^*$, the target d-axis electric current $I_{d01}^*$, the target q-axis electric current $I_{q01}^*$, and the target q-axis electric current $I_{q02}^*$. Accordingly, the rotary machine control device 1 (1*a*, 1*b*) is capable of controlling the rotational speed of the rotary machine 10 to a desired value.

In addition, in each of the above embodiments, the command value of the rotary machine 10 may be used as a position command. In this case, the electric current command arithmetic unit 70 (70*a*, 70*b*) constitutes a feedback control system that causes the rotational position of the rotary machine 10 to follow the target position, and performs arithmetic operations of the target d-axis electric current $I_{d01}^*$, the target d-axis electric current $I_{d02}^*$, the target q-axis electric current $I_{q01}^*$, and the target q-axis electric current $I_{q02}^*$. Accordingly, the rotary machine control device 1 (1*a*, 1*b*) is capable of controlling the rotational speed of the rotary machine 10 to a desired value.

Further, in each of the above embodiments, the command value of the rotary machine 10 may be set to the target d-axis electric current $I_{d01}^*$, the target q-axis electric current $I_{q01}^*$, the target d-axis electric current $I_{d02}^*$ ($=I_{d01}^*$), and the target q-axis electric current $I_{q02}^*$ ($=I_{q01}^*$) that have been set beforehand. Accordingly, the rotary machine control device 1 (1*a*, 1*b*) is capable of controlling the rotational speed of the rotary machine to a desired value.

In addition, in each of the above embodiments, the description has been given with regard to an example in which the controllers 7-1 (7*a*-1, 7*b*-1) and the controllers 7-2 (7*a*-2, 7*b*-2) each include a CPU, but there is no intention to be limited to this. Both the controller 7-1 (7*a*-1, 7*b*-1) and the controller 7-2 (7*a*-2, 7*b*-2) may be controlled by one CPU. In this case, one CPU takes in the first DC voltage Vdc

1 s and the second DC voltage Vdc2*s*, and performs arithmetic operations of the controller 7-1 (7*a*-1, 7*b*-1) and the controller 7-2 (7*a*-2, 7*b*-2).

Note that each constitution included in the above-described rotary machine control device 1 (1*a*, 1*b*) includes a computer system in its inside. Then, a program for implementing functions of each constitution included in the above-described rotary machine control device 1 (1*a*, 1*b*) may be recorded in a computer-readable recording medium, and processing in each constitution included in the above-described rotary machine control device 1 (1*a*, 1*b*) may be performed by causing a computer system to read and execute the program recorded in the recording medium. Here, "causing a computer system to read and execute the program recorded in the recording medium" includes installing the program in the computer system. The "computer system" herein includes an OS and hardware such as peripheral devices.

In addition, the "computer system" may include a plurality of computer devices connected through a network including a communication line such as the Internet, a WAN, a LAN, or a dedicated line. Further, the "computer-readable recording medium" denotes a portable medium such as a flexible disk, a magneto-optical disk, a ROM, or a CD-ROM, or a storage device such as a hard disk built in a computer system. In this manner, the recording medium storing the program may be a non-transitory recording medium such as a CD-ROM.

In addition, the recording medium also includes a recording medium provided internally or externally that can be accessed from a distribution server so as to distribute the program. Note that a constitution in which the program is divided into a plurality of pieces, which are downloaded at different timings and are then combined with each constitution included in the rotary machine control device 1 (1*a*, 1*b*) or different distribution servers for respectively distributing the divided programs may be provided. Furthermore, the "computer-readable recording medium" includes a medium that holds a program for a certain period of time, such as a volatile memory (RAM) inside a computer system that serves as a server or a client when the program is transmitted through a network.

In addition, the program may be for implementing a part of the above-described functions. Furthermore, the above-described functions may be implemented by a combination with a program already recorded in a computer system, that is, a so-called differential file (differential program).

In addition, some or all of the above-described functions may be implemented as an integrated circuit such as a large scale integration (LSI). Each of the above-described functions may be individually constituted into a processor, or some or all of the functions may be integrated into a processor. Further, a method for constituting the integrated circuit is not limited to LSI, and may be implemented with a dedicated circuit or a general-purpose processor. In addition, in a case where progress of the semiconductor technology generates a technology for constituting an integrated circuit that replaces the LSI, the integrated circuit in accordance with such a technology may be used.

REFERENCE SIGNS LIST

1, 1*a*, 1*b* Rotary machine control device
2 Position detector
3-1, 3-2 DC power supply
4-1, 4-2 Capacitor
5-1, 5-2 Inverter

6-1, 6-2 Electric current detector
7, 7-1, 7-2, 7a, 7a-1, 7a-2, 7b, 7b-1, 7b-2 Controller
10 Rotary machine
51-1, 51-2, 52-1, 52-2, 53-1, 53-2, 54-1, 54-2, 55-1, 56-2 Switching element
70-1, 70-2, 70a-1, 70a-2, 70b-1, 70b-2 Electric current command arithmetic unit
71-1, 71-2, 73-1, 73-2 Subtractor
72-1, 72-2, 74-1, 74-2 Electric current controller
75-1, 75-2 Coordinate converter
76-1, 76-2 Control signal generator
81-1, 83-1 Multiplier
82-1, 84-1, 86-1, 722-1, 742-1 Adder
91-1, 91-2, 92-1, 92-2 DC part electric current detector
100 Electric power steering device
101 Steering wheel
102 Torque sensor
103 Steering shaft
104 Wheel
105 Rack and pinion gear
106 Control device
721-1, 723-1, 741-1, 743-1 Amplifier
724-1, 744-1 Integrator
725-1, 745-1 Limiter
761-1 Duty arithmetic unit
762-1 Carrier comparator

The invention claimed is:

1. A rotary machine control device comprising:
a first inverter that applies an alternating-current voltage to three-phase windings of a first system included in a rotary machine, according to a first direct-current voltage that has been output from a first direct-current power supply;
a second inverter that applies an alternating-current voltage to three-phase windings of a second system included in the rotary machine, according to a second direct-current voltage that has been output from a second direct-current power supply;
a first controller that generates a command value of a d-axis electric current of the first system, according to a direct-current voltage minimum value and a command value of the rotary machine, the direct-current voltage minimum value being a lower one of the first direct-current voltage and the second direct-current voltage, that also generates a command value of a q-axis electric current of the first system, according to the direct-current voltage minimum value and the command value of the d-axis electric current of the first system, and that outputs a first control signal for causing the first inverter to apply the alternating-current voltage to the three-phase windings of the first system, according to the command value of the d-axis electric current of the first system and the command value of the q-axis electric current of the first system that have been generated; and
a second controller that generates a command value of a d-axis electric current of the second system, according to the direct-current voltage minimum value and the command value of the rotary machine, that also generates a command value of a q-axis electric current of the second system, according to the direct-current voltage minimum value and the command value of the d-axis electric current of the second system, and that outputs a second control signal for causing the second inverter to apply the alternating-current voltage to the three-phase windings of the second system, according to the command value of the d-axis electric current of the second system and the command value of the q-axis electric current of the second system that have been generated.

2. The rotary machine control device according to claim 1, wherein
the first controller limits either the command value of the d-axis electric current of the first system or the command value of the q-axis electric current of the first system, according to an integrated value of a first electric current, that is an electric current that flows through the three-phase windings of the first system, and
the second controller limits either the command value of the d-axis electric current of the second system or the command value of the q-axis electric current of the second system, according to an integrated value of a second electric current, that is an electric current that flows through the three-phase windings of the second system.

3. The rotary machine control device according to claim 2, wherein
the first controller calculates the integrated value of the first electric current, according to the command value of the d-axis electric current of the first system and the command value of the q-axis electric current of the first system, and limits either the command value of the d-axis electric current of the first system or the command value of the q-axis electric current of the first system, according to the integrated value of the first electric current that has been calculated, and
the second controller calculates the integrated value of the second electric current, according to the command value of the d-axis electric current of the second system and the command value of the q-axis electric current of the second system, and limits either the command value of the d-axis electric current of the second system or the command value of the q-axis electric current of the second system, according to the integrated value of the second electric current that has been calculated.

4. The rotary machine control device according to claim 2, further comprising:
a first electric current detector that detects the electric current that flows through the three-phase winding of the first system; and
a second electric current detector that detects the electric current that flows through the three-phase winding of the second system, wherein
the first controller calculates the integrated value of the first electric current, according to a detected electric current that has been detected by the first electric current detector, and limits either the command value of the d-axis electric current of the first system or the command value of the q-axis electric current of the first system, according to the integrated value of the first electric current that has been calculated, and
the second controller calculates the integrated value of the second electric current, according to a detected electric current that has been detected by the second electric current detector, and limits either the command value of the d-axis electric current of the second system or the command value of the q-axis electric current of the second system, according to the integrated value of the second electric current that has been calculated.

5. The rotary machine control device according to claim 1, wherein
the first controller limits either the command value of the d-axis electric current of the first system or the command value of the q-axis electric current of the first system, according to an integrated value of a larger direct-current part electric current out of a first direct-current part electric current and a second direct-current part electric current, the first direct-current part electric current being an electric current output from the first direct-current power supply to the first inverter, the second direct-current part electric current being an electric current output from the second direct-current power supply to the second inverter, and the second controller limits either the command value of the d-axis electric current of the second system or the command value of the q-axis electric current of the second system, according to the integrated value of the larger direct-current part electric current.

6. The rotary machine control device according to claim 5, wherein the first controller determines the larger direct-current part electric current, according to the second direct-current part electric current that has been estimated, according to the first direct-current voltage, the second direct-current voltage, and the first direct-current part electric current, and the second controller determines the larger direct-current part electric current, according to the first direct-current part electric current that has been estimated, according to the second direct-current voltage, the first direct-current voltage, and the second direct-current part electric current.

7. The rotary machine control device according to claim 1, wherein the first controller corrects the command value of the q-axis electric current of the first system to decrease, in a case where a first voltage command value, that is a command value for a voltage applied to the three-phase windings of the first system, is larger than a comparison value according to the direct-current voltage minimum value, and corrects the command value of the q-axis electric current of the first system to increase, in a case where the first voltage command value is smaller than the comparison value, and the second controller corrects the command value of the q-axis electric current of the second system to decrease, in a case where a second voltage command value, that is a command value for a voltage applied to the three-phase windings of the second system, is larger than the comparison value according to the direct-current voltage minimum value, and corrects the command value of the q-axis electric current of the second system to increase, in a case where the second voltage command value is smaller than the comparison value.

8. The rotary machine control device according to claim 7, wherein the first controller generates the first voltage command value, according to the d-axis electric current of the first system, the q-axis electric current of the first system, a rotational speed of the rotary machine, and an electric constant of the rotary machine, and the second controller generates the second voltage command value, according to the d-axis electric current of the second system, the q-axis electric current of the second system, the rotational speed of the rotary machine, and the electric constant of the rotary machine.

9. The rotary machine control device according to claim 1, wherein the first controller includes a first central processing unit (CPU), the second controller includes a second CPU, the first CPU transmits the first direct-current voltage to the second CPU, and the second CPU transmits the second direct-current voltage to the first CPU.

10. An electric power steering device comprising:

the rotary machine control device of claim 1;

the rotary machine that assists steering; and a torque sensor that detects steering torque in the steering, wherein the rotary machine control device controls the rotary machine with an assist command of the steering in accordance with the steering torque that has been detected by the torque sensor, as a command value of the rotary machine.

\* \* \* \* \*